United States Patent
Mahadik et al.

(10) Patent No.: US 12,314,777 B2
(45) Date of Patent: May 27, 2025

(54) EFFICIENT ADAPTIVE ALLOCATION OF RESOURCES FOR COMPUTATIONAL SYSTEMS VIA STATISTICALLY DERIVED LINEAR MODELS

(71) Applicant: ADOBE INC., San Jose, CA (US)

(72) Inventors: Kanak Vivek Mahadik, San Jose, CA (US); Tong Yu, San Jose, CA (US)

(73) Assignee: Adobe Inc., San Jose, CA (US)

( * ) Notice: Subject to any disclaimer, the term of this patent is extended or adjusted under 35 U.S.C. 154(b) by 442 days.

(21) Appl. No.: 17/749,577

(22) Filed: May 20, 2022

(65) Prior Publication Data

US 2023/0376356 A1 Nov. 23, 2023

(51) Int. Cl.
*G06F 9/50* (2006.01)
*G06F 18/21* (2023.01)

(52) U.S. Cl.
CPC .......... *G06F 9/5077* (2013.01); *G06F 9/5033* (2013.01); *G06F 9/5038* (2013.01); *G06F 18/217* (2023.01)

(58) Field of Classification Search
CPC .... G06F 9/5077; G06F 9/5005; G06F 18/217; G06F 9/5038; G06F 9/5033; G06F 2209/508
See application file for complete search history.

(56) References Cited

U.S. PATENT DOCUMENTS

| | | | | |
|---|---|---|---|---|
| 2010/0083248 A1* | 4/2010 | Wood | .................. | G06F 9/45558 718/1 |
| 2014/0245297 A1* | 8/2014 | Hackett | ................. | G06F 9/5077 718/1 |
| 2014/0282541 A1* | 9/2014 | Perlegos | ............... | G06F 9/5083 718/1 |

(Continued)

FOREIGN PATENT DOCUMENTS

| | | | | |
|---|---|---|---|---|
| CN | 104765642 A | * | 7/2015 | ............... G06F 9/50 |
| WO | WO 2019062697 | * | 4/2019 | ............ G06F 17/16 |

OTHER PUBLICATIONS

Auer, P., Cesa-Bianchi, N., & Fischer, P. (2002). Finite-time analysis of the multiarmed bandit problem. Machine learning, 47(2), 235-256.

(Continued)

*Primary Examiner* — Charles E Anya
(74) *Attorney, Agent, or Firm* — Shook, Hardy & Bacon L.L.P.

(57) ABSTRACT

Systems and methods that enable the efficient and adaptive allocation of resources dedicated to a virtualized resource-based computation (e.g., one or more information processing tasks) are provided. In one embodiment, a reward model is generated based on a set of statistical distributions, for example, in response to receiving a request to launch a set of VCRs. Thereafter, an expected reward is predicting for each configuration of a set of configurations based on the reward model and one or more parameters of the corre- (Continued)

sponding configuration. The expected reward indicates an efficiency in distribution or allocation of physical computation resources to the set of VCRs. A configuration of the set of configurations is selected based on the predicted expected reward for the configuration. The set of VCRs are then configured with the selected configuration.

20 Claims, 8 Drawing Sheets

(56) References Cited

U.S. PATENT DOCUMENTS

| | | | | |
|---|---|---|---|---|
| 2015/0215234 | A1* | 7/2015 | Shanmuganathan | G06F 11/3433 709/226 |
| 2017/0103413 | A1* | 4/2017 | He | G06Q 30/0244 |
| 2017/0199752 | A1* | 7/2017 | Cao | G06F 11/3409 |
| 2019/0155633 | A1* | 5/2019 | Faulhaber, Jr. | G06N 5/04 |
| 2020/0034701 | A1* | 1/2020 | Ritter | G06F 9/5005 |
| 2021/0311786 | A1* | 10/2021 | Tzortzatos | G06F 9/5011 |
| 2021/0357256 | A1* | 11/2021 | Cao | G06F 9/5005 |
| 2022/0343243 | A1* | 10/2022 | Huang | G06Q 10/06315 |

OTHER PUBLICATIONS

Auer, P., Cesa-Bianchi, N., Freund, Y., & Schapire, R. E. (2002). The nonstochastic multiarmed bandit problem. SIAM journal on computing, 32(1), 48-77.

Calheiros, R. N., Masoumi, E., Ranjan, R., & Buyya, R. (2014). Workload prediction using ARIMA model and its impact on cloud applications' QoS. IEEE transactions on cloud computing, 3(4), 449-458.

Lattimore, T., and Szepesv'A Ri, C. Bandit algorithms. Cambridge University Press, 2020.

Lorido-Botran, T., Miguel-Alonso, J., & Lozano, J. A. (2014). A review of auto-scaling techniques for elastic applications in cloud environments. Journal of grid computing, 12(4), 559-592.

Park, Y., Mahadik, K., Rossi, R. A., Wu, G., & Zhao, H. (Nov. 2019). Linear quadratic regulator for resource-efficient cloud services. In Proceedings of the ACM Symposium on Cloud Computing (pp. 488-489).

Russo, D. J., Van Roy, B., Kazerouni, A., Osband, I., & Wen, Z. (2018). A tutorial on thompson sampling. Foundations and Trends® in Machine Learning, 11(1), 1-96.

Sutton, Richard S., and Andrew G. Barto. Reinforcement learning: An introduction. MIT press, 2018.

* cited by examiner

EFFICIENT ADAPTIVE ALLOCATION OF RESOURCES FOR COMPUTATIONAL SYSTEMS VIA STATISTICALLY DERIVED LINEAR MODELS

BACKGROUND

Computation (e.g., information processing) is routinely performed via virtualized computational resources. For instance, many modern-day cloud and/or web-based computational services are implemented via virtualized resources. Such virtualized resources include containers, virtual machines (VMs), virtual storage, virtualized memory banks, virtual networks, and other virtual computation assets. These and other virtualized resources are instantiated via physical computational hardware, e.g., physical computer devices, physical storage drives, physical memory chips, and physical network hardware. When operating such virtualized computational resources, a decision must be made as to how to allocate and/or distribute the limited physical resources to the virtualized resources. Allocating and/or distributing physical resources to one or more virtualized resources are referred to as configuring the virtualized resources. Traditionally, such allocation and/or distribution decisions are performed manually, or partially automated via heuristics.

Such traditional configuration methods often result in the inefficient allocation of resources and/or disruptions in computational services. In this regard, these allocation and/or distribution decisions are analogized to the generalized economic-problem of matching the supply and demand curves for one or more particular resources and one or more particular environments and/or uses. As in any domain of activity that involves distributing a limited resource across multiple potential uses, allocating too little or too much of the limited resource to a particular use introduces unwanted inefficiencies in the employment of the resource. For instance, if too many physical processing devices are allocated to an under-utilized VM, the processing cycles of the physical processor are wasted, because these fallow cycle were utilized for another job performed by another VM. In contrast, if too few physical processing devices are allocated to a heavily utilized VM, then the VM is not be able to service requests within a predetermined latency period that is required for the VM's particular job. In some environments, the distribution of physical resources are dynamically re-scaled due to real-time fluctuations in demand. However, such re-scaling efforts fail to adequately compensate for inefficiencies introduced by less-than-ideal resource distribution decisions, at least because such re-scaling events provide temporary disruptions to computational services provided to an end-user.

SUMMARY

The technology described herein is directed towards enhanced methods and systems for the efficient and adaptive allocation of resources for virtualized-based computation via Markov Decision Processes (MDP). At a high level, configurations for a set of visualized computational resources (VCRs) are selected and implemented. To do so, a reward model that indicates efficiency in distribution or allocation of physical computation resources to the set of VCRs is generated. The reward model is generated or updated based on sampling a set of statistical distributions. Each statistical distribution of the set of statistical distributions corresponds to a separate coefficient of the set of coefficients in the reward model. In accordance with generating or updating the reward model, an expected reward for each configuration of a set of configurations is estimated. Estimating the expected reward for a configuration of the set of configurations is based on the reward model and a vector representation of the configuration. Each configuration of the set of configurations corresponds to a candidate allocation of the set of VCRs. Based on the expected rewards, a particular configuration of the set of configurations is selected and/or identified (e.g., based on a highest or greatest expected reward indicating a high efficiency in distribution or allocation of physical computation resources to the set of VCRs). The selected configuration is then initiated in association with the set of VCRs in accordance with the first configuration. As described herein, an iterative process can be employed to update configurations applied to the set of VCRs.

DETAILED DESCRIPTION

Figure 1A:
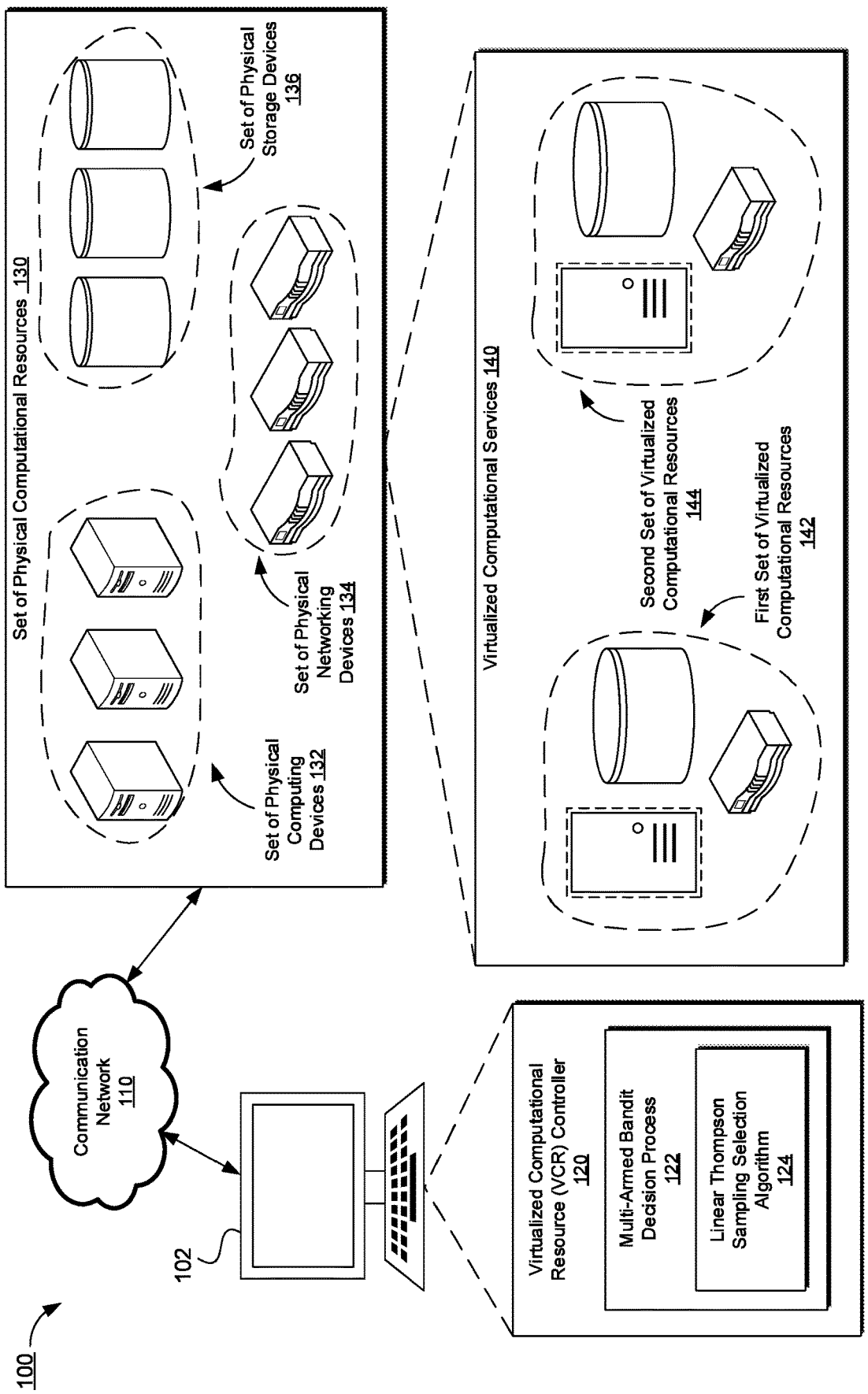
FIG. 1A illustrates an enhanced virtualized computational resource-based computational system implementing various embodiments presented herein.

As noted above, distributing and/or allocating physical computational resources to virtualized computational resources are analogized to the general economic problem of distributing a finite and/or limited resource (e.g., the supply) across a pool of potential uses (e.g., the demand). As in many economic domains, the supply of physical computational resources is smaller than the demand for the physical computational resources (e.g., the virtualized computational resources). As also noted above, conventional manual techniques such as heuristics and other hard-coded decisional algorithms have been applied to the problem of distributing/allocating finite resources to virtualized resources. However, such manual approaches often result in the inefficient allocation of the resources.

In addition to manual approaches, some conventional machine learning (ML) approaches have been applied to the problem of distributing computational resources. Inherent in many ML approaches is the issue of spending limited temporal and spatial computational capital by exploring the search space of possible solutions versus spending the temporal and spatial computational capital by exploiting the previously learned knowledge of the space of possible solutions. In ML literature, this is often referred to as the problem of balancing exploration and exploitation. Conventional ML techniques that have been applied to distributing computational resources struggle with the exploration/exploitation balance in various ways discussed throughout.

As such, the embodiments herein are directed towards enhanced methods and systems for the efficient and adaptive allocation of resources for virtualized-based computation via Markov Decision Processes (MDP). In at least some embodiments, the MDP is a state-independent (or a single-state) MDP. Thus, in these non-limiting embodiments, the MDP is an enhanced multi-armed banded (MAB) decision process. The enhanced MAB decision process employs an enhanced Linear Thompson Sampling (LTS) algorithm for the selection of configurations. The LTS algorithm employs a domain-specific reward function (or reward model). The reward model is learned over a resource-allocation vector space (e.g., vectors encoding configurations that span a configuration space).

One non-limiting embodiment includes an enhanced method for providing requested computational services via a set of visualized computational resources (VCRs), which overcomes the deficiencies of conventional approaches, as outlined above. The enhanced method includes instantiating the reward model based on sampling a set of statistical distributions. The reward model includes a set of coefficients. Each statistical distribution of the set of statistical distributions corresponds to a separate coefficient of the set of coefficients. An expected reward for each configuration of a set of configurations is estimated. Estimating the expected reward for a configuration of the set of configurations is based on the reward model and a vector representation of the configuration. Each configuration of the set of configurations corresponds to a candidate allocation of the set of VCRs. A first configuration of the set of configurations is selected and/or identified based on the expected reward for each of the configurations of the set of configurations. The method includes causing operation of the set of VCRs in accordance with the first configuration.

More specifically, the embodiments are directed towards systems and methods that enable the efficient and adaptive allocation of physical computational resources (PCRs) dedicated to one or more sets VCRs. The embodiments employ a virtualized computational resource (VCR) controller to launch and dynamically update (e.g., manage and/or control) the resource allocation (e.g., indicated by a selected configuration) for one or more sets of VCRs. The VCR controller implements a MDP-based control loop to adaptively configure (e.g., allocate resources for) the set of virtualized resources. In some embodiments, the MDP of the control loop is a single-state MDP (e.g., a multi-armed bandit decision process). In such embodiments, each possible configuration for the set of VCRs is an arm of the MAB. In embodiments that employ a MAB and/or MAB-like decision process, the VCR controller is and/or includes a bandit agent. The set of configurations is encoded in features vectors that span a configuration space of a set of VCRs.

A MAB (or MAB-like) decision process is employed to balance the exploration/exploitation tradeoff inherent in the iterative estimation of the rewards associated with machine learning methods via one or more selection algorithms, such as but not necessarily limited to stochastic selection algorithm, e.g., a non-deterministic selection algorithm. In some embodiments, the selection algorithm is and/or include an enhanced Linear Thompson Sampling (LTS) (or LTS-like) process. The enhanced LTS process is a scalable process that efficiently "learns" the configuration space. An enhanced LTS-based controller (e.g., the bandit agent included in the VCR controller) employs a domain-specific reward function. In embodiments, the reward is approximated via a model that includes a linear function. The model and/or linear function include a set of coefficients, parameters, and or components that are learned via the enhanced LTS process. Each configuration in the set of configurations is characterized via a feature vector embedding of each configuration. The set of model coefficients is generally learned based on the monitoring of utilization data generated from the deployment of one or more sets of VCRs via sampling the configuration space in accordance to an enhanced LTS process.

Various embodiments employ feature vectors to characterize the configurations of the set of configurations employed to configure the set of VCRs. The various embodiments can additionally employ various metrics to characterize the performance of a set of VCRs. The feature vectors and metrics can be used to learn a linear function that accurately estimates (or predicts) the performance of the set of VCRs (via an estimated and/or predicted value for a reward function), as a function of the feature vector of the various configurations. The embodiments employ a domain-specific linear reward function. Some embodiments additionally employ the enhanced LTS algorithm to enable the multi-armed bandit framework. Each possible configuration of the set of configurations corresponds to an arm of the bandit, and the performance of a deployed set of VCRs is used to derive the reward (i.e., feedback) for the corresponding configuration. The enhanced LTS algorithm (or process) employs one or more linear functions to approximate the domain-specific rewards via the feature vectors of the configurations. These and other aspects of the embodiments enable a highly scalable VCR controller that efficiently learns to predict the performance of various sets of VCRS, as a function of their configuration and expected workloads.

More particularly, one or more sets of physical computational resources (PCRs) are distributed across one or more sets of VCRs. In some embodiments, a physical computational resource includes one or more physical processing devices, physical computer devices and/or machine, physical storage drives, physical memory devices, physical network devices, or the like. A virtualized computational resource includes one or more containers, virtual machines (VMs), virtual storage drives, virtual memory devices, virtual network devices (e.g., routers, gateways, network traffic controllers (NTC)), and the like). As used throughout, the terms "virtual" and "virtualized" are interchangeably employed to differentiate physical computational resources from virtualized computational resources.

A configuration for a set of VCRs refers to an allocation, distribution, and/or mapping of physical computational resources to the set of VCRs. A set of possible and/or candidate configurations is made available to the VCR controller. Each configuration of the set of configurations corresponds to a separate possible, potential, and/or candidate allocation of physical computational resources that are made available to (e.g., allocated for) the set of VCRs. Thus, the set of configurations corresponds to a configuration space for the set of VCRs. When launching (e.g., initializing) the set of VCRs, the VCR controller selects a configuration for the set of VCRs, via a selection algorithm. The set of VCRs is employed to implement a set of computational services (e.g., an instantiation of an application) and the set of computational services is executed under a temporally-varying workload. Under the workload, temporally-varying utilization data is generated that encodes the utilization of the physical resources allocated for the set of VCRs. As noted throughout, the selection of the configuration for the set of VCRs is based on an MDP, such as but not limited to a multi-armed bandit (MAB) decision process, where each configuration of the set of configurations corresponds to an arm of the MAB.

Once the set of VCRs is initially launched, the VCR controller implements a control loop for the set of VCRs. The utilization data provides feedback for the control loop. More specifically, the VCR controller actively monitors utilization data for the set of VCRs and adaptively re-configures (e.g., updates) the set of VCRs based on an analysis of the utilization data (e.g., the feedback of the control loop). When re-configuring the set of VCRs, another configuration from the set of configurations is selected via the selection algorithm. As noted above, the selection algorithm can be an enhanced LTS (or an enhanced LTS-like) algorithm. The updated configuration is the same configuration or a different re-configuration dependent on an analysis of the utilization data, a stochastic nature of the selection algorithm, and/or estimates for a reward metric corresponding to each configuration in the set of configurations. When the updated configuration is different than the current configuration, the allocation of the resources dedicated to the set of VCRs is generally updated (e.g., a scale-up or a scale-down event are triggered for the set of VCRs). The VCR controller continues to monitor the utilization data, in view of the updated set of controllers, and continues to adapt the configuration of the set of VCRs based on the monitored utilization data and the MDP (e.g., a MAB decision process).

When launching or updating the set of VCRs, the VCR controller implements an MDP to select a configuration from the set of configurations. As noted above, in embodiments, the MDP is a multi-armed bandit (MAB) decision process, e.g., an MDP that is state independent or one that includes only a single state. In the embodiments, each configuration of the set of configurations is representative of (or analogous to) a separate arm on the MAB. A reward metric for each arm (e.g., for each configuration) is iteratively estimated based on how closely the currently allocated resources matches the current workload of the application, as encoded in the utilization data. Thus, the controller iteratively estimates and uses a set of rewards, where there is a one-to-one (1-to-1) correspondence between the configurations of the set of configurations and the rewards of the set of rewards. The MAB decision process balances the exploration/exploitation tradeoff inherent in the iterative estimation of the rewards via one or more selection algorithms, such as but not necessarily limited to stochastic selection algorithm, e.g., a non-deterministic selection algorithm. In some embodiments, the selection algorithm is a deterministic selection algorithm. The (stochastic or deterministic) selection algorithm employs the value for a current estimate of each of the rewards of the set of rewards to select a configuration from the set of configurations. At noted above, in various embodiments, the selection algorithm in an enhanced LTS (or LTS-like) algorithm.

Other embodiments employ selection algorithms other than LTS algorithms. Selection algorithms other than LTS selection algorithms include, but need not be limited to an epsilon-greedy algorithm, a softmax algorithm, an upper confidence bound (UCB) algorithm, explore-then-commit, an exponential-weight algorithm (e.g., EXP3) for exploration and exploitation, and the like. Various embodiments for employing these other selection algorithms are discussed in U.S. patent application Ser. No. 12,164,965, entitled EFFICIENT ADAPTIVE ALLOCATION OF RESOURCES FOR CONTAINER-BASED COMPUTATION VIA MARKOV CHAIN DECISION PROCESS, filed on Jul. 28, 2021, the contents of which are incorporated herein in their entirety. In some embodiments, the selection algorithm selects a configuration from the set of configurations based on a ranking of the set of reward metrics, an exploration-exploitation balancing policy, and/or a stochastically-determined value (e.g., a random or a pseudo-random value).

Although the discussion throughout is directed towards MAB (e.g., single-state MDP) embodiments, it should be understood that the embodiments are not so constrained, and a multi-state MDP is employed in other embodiments. For instance, a plurality of states is defined for the set of VCRs (e.g., states characterized by current and/or previous portions of the utilization data), and the set of actions of the MDP corresponds to the set of configurations. The selection of a configuration (e.g., an action to perform via the MDP) is based on the set of VCRs' current state, and possibly one or more previous states. The performance of an action (e.g., the reconfiguration of the set of VCRs) transitions the current state of the set of VCRs to another available state (e.g., an increase or decrease in the utilization of the allocated resources).

In various embodiments, each configuration of the set of configurations indicates a measure of an amount of physical processor devices (e.g., CPUs) that are allocated for the set of VCRs. The measure of the amount of allocated CPUs is indicated as cpu_num. In some embodiments, cpu_num is an integer that indicates a number of physical CPU devices allocated to each VCR (e.g., one or more VMs and/or containers) in a set of VCRs. In other embodiments, cpu_num is an integer that indicates a total number of physical CPU devices allocated to the entirety of a set of VCRs. In some embodiments, the VMs and/or containers in the set of VCRs are allocated an equivalent number of physical CPU devices. Thus, cpu_num scales linearly with a cardinality of the set of VMs and/or containers. In other embodiments, the number of physical CPU devices allocated for the VMs and/or containers varies across the elements of the set of VCRs.

Each configuration of the set of configurations additionally indicates a trigger condition for initiating a scale-up event (e.g., an upper-utilization threshold) for the set of VCRs, as well as a trigger condition for initiating a scale-down event (e.g., a lower-utilization threshold) for the set of VCRs. The upper-utilization threshold is a high-water mark (hw) and is indicated as scal_hi. The lower-threshold is a low-water mark (lw) and is indicated as scal_lo. In various embodiments, $0.0 \leq scal\_lo < scal\_hi \leq 1.0$. The utilization data encodes a fractional utilization of the allocated resources (e.g., a percentage of the allocated CPUs (as indicated by num cpu) being utilized, as a function of time). When the current utilization exceeds the upper-utilization threshold, the set of VCRs is updated via a scale-up event. Similarly, when the current utilization dips below the lower-utilization threshold, the set of VCRs is updated via a scale-down event. In some embodiments, a scaling event includes vertically scaling the set of VCRs (e.g., increasing or decreasing the number of CPU devices allocated for one or more VCRs of the set of VCRs). In other embodiments, a scaling event includes horizontally scaling the set of VCRs (e.g., increasing or decreasing the number of VCRs included in the set of VCRs). A scale-up or a scale-down event includes (horizontally or vertically) scaling the set of VCRs by a specified factor. Thus, each configuration of the set of configurations is encoded in a feature vector x, with three components: x=(cpu_num$_i$, scal_lo$_i$, scal_hi$_i$). The vector x serves as a feature vector for the corresponding configuration. In other embodiments, additional computational resources are allocated via a configuration of the set of configurations, such as but not limited to memory, graphical processing unit (GPU) cycles, network resources, and the like. In such embodiments, the feature vectors for the configuration include more than three components (e.g., an independent component for each of the configurable parameters). In some embodiments, the feature vector x is treated as a n-tuple.

As noted above, a reward (e.g., a reward metric) is associated with each configuration of the set of configurations. After sufficient utilization data has been acquired for particular configuration, the VCR controller can update an estimate for the particular configuration's corresponding reward. In some embodiments, the estimate for a configuration's reward is updated after a scaling event, or when the controller re-configures the set of VCRs. Note that each scaling event results in a re-configuration event, because a scaling event results in the value of cpu_num beings updated.

As noted above, configuring a set of VCRs for vitalized-computation task is traditionally performed manually, or partially automated via heuristics. Besides involving manual labor, such traditional methods often result in the inefficient allocation of resources and/or disruptions in computational services. Because multi-armed bandits (and MDP in general) balance the exploration and exploitation tradeoffs inherent when making decision under incomplete information (e.g., the set of rewards is unknown and iteratively estimated), the embodiments increase the efficiency when allocating resources for VCR-based computation. Accordingly, the embodiments inherently improve the performance of computation systems.

The various embodiments provide additional benefits over conventional approaches for configuring a set of VCRs, such as but not limited to other MAB approaches. The space and/or time complexity of conventional MAB approaches (such as those that employ other selection algorithms without parameterization, e.g., those that employ Upper Confidence Bound (UCB) selection algorithm) is often significant. Because the reward model employed herein is parametrized, at least the space and time complexity is decreased significantly from these traditional approaches with increased space complexity.

In traditional approaches, when the number of configuration variables (e.g., D) is increased, the number of configurations will increase exponentially. Accordingly, the number of learnable parameters (for the distribution or upper confidence bound) will also increase exponentially. As a result, when D increases, the memory and computational costs will increase exponentially to maintain these model parameters. On the contrary, via the feature vectors of the configuration space and the reward model parameterization herein, the memory and computational costs will only increase linearly when increasing the dimensionality of the feature vector (e.g., D), and quadratically when changing the size of the covariance matrix (as discussed below). Therefore, the time and space complexity of the various embodiments is significantly reduced, as compared to conventional approaches.

As used herein, the term "virtualized computational resources" (VCRs) refers to one or more virtualized computations objects, such as but not limited to one or more containers, virtual machines (VMs), virtual storage drives, virtual memory devices, virtual network devices (e.g., routers, gateways, network traffic controllers (NTC)), and the like). Thus, a VCR is implemented via one or more physical computational resources (PCRs). As used throughout, the terms "virtual" and "virtualized" are interchangeably employed to differentiate physical computational resources from virtualized computational resources. Thus, a set of VCRs includes a collection of one or more VCRs.

As used herein, the term "configuration" for a set of VCRs refers to information that encodes the distribution and/or allocation of physical computational resources to the set of VCRs. Thus, a configuration for a set of VCRs encodes a number of physical processing devices (e.g., CPUs, GPUs, and the like), a number of physical logical devices (e.g., FPGAs, ASICs, and the like), a number of physical volatile/non-volatile memory devices (e.g., DRAMs, SDRAMs, and the like), a number of physical non-volatile storage devices (e.g., magnetic/solid state drives, EEPROMs, FLASH, and the like), or a number of physical network devices (e.g., gateways, routers, network traffic devices, and the like). A configuration encodes additional conditions or triggers for scaling events (e.g., a scale up or a scale down event) for the set of VCRs. For example, a number of physical devices (e.g., CPUs) that are allocated to a deployed set of VCRs is increased (e.g., a scale up event) or decreases (e.g., a scale-down event) under various conditions. A configuration encodes the various conditions for various types of scaling events. Such scaling conditions includes various thresholds for the utilizations of the physical devices currently allocated to the set of VCRs. As noted throughout, a particular configuration is encoded in a multi-dimensional 1-tensor (e.g., a vector), a n-tuple, or the like. A set of configurations includes each discrete (or separate) configuration that is possible or available to a set of VCRs. That is, a configuration is an available, potential, candidate, or possible configuration for a set of VCRs.

As used herein, a "reward model" refers to (deterministic or stochastic) function or mapping, that maps an input configuration to an "expected" reward metric for the configuration. That is, the reward model estimates or predicts a (performance) reward if the set of VCRs were to be deployed with the input configuration. The reward metric indicates an efficiency in the distribution and/or allocation of the physical computational resources to the set of VCRs. In various embodiments, a reward model includes a set of coefficients, components, or parameters. A reward model includes, or is based on, a set of statistical distributions that are generated via monitoring utilization data for sets of VCRS that were deployed via the various configurations in the set of possible configurations. In some embodiments, each statistical distribution from the set of statistical distributions corresponds to a separate coefficient of the set of coefficients. A particular reward model is instantiated and/or generated by sampling a coefficient from each of the respective statistical distributions. Thus, generating an instantiation of a reward. The samples from the distributions are employed for the instantiation of the reward model. The set of coefficients includes coefficients components, and/or parameters of a tensor object (e.g., a vector, a matrix, or a higher order tensor). The reward model is a linear model. That is, the predicted expected reward is a linear function that linearly combines the set of coefficients with the vector representation of the input configuration.

As used herein, the term "set" is employed to refer to an ordered (i.e., sequential) or an unordered (i.e., non-sequential) collection of objects (or elements), such as but not limited to machines (e.g., computer devices), physical and/or logical addresses, graph nodes, graph edges, and the like. A set includes N elements, where N is any non-negative integer. That is, a set includes 0, 1, 2, 3, . . . N objects and/or elements, where N is a positive integer with no upper bound. Therefore, as used herein, a set could be a null set (i.e., an empty set), that includes no elements (e.g., N=0 for the null set). A set could include only a single element. In other embodiments, a set could include a number of elements that is significantly greater than one, two, three, or billions of elements. A set could be an infinite set or a finite set. In some embodiments, "a set of objects" that is not a null set of the objects could be interchangeably referred to as either "one or more objects" or "at least one object." A set of objects that includes at least two of the objects could be referred to as "a plurality of objects."

As used herein, the term "subset," is a set that is included in another set. A subset could be, but is not required to be, a proper or strict subset of the other set that the subset is included within. That is, if set B is a subset of set A, then in some embodiments, set B is a proper or strict subset of set A. In other embodiments, set B is a subset of set A, but not a proper or a strict subset of set A. For example, set A and set B could be equal sets, and set B could be referred to as a subset of set A. In such embodiments, set A could also be referred to as a subset of set B. Two sets could be disjoint sets if the intersection between the two sets is the null set.

Operating Environment for Virtualized Computational Resource-Based Computation

FIG. 1A illustrates an enhanced virtualized computational resource (VCR)-based computational system 100 implementing various embodiments presented herein. Computational system 100 is enabled to efficiently and adaptively allocate resources for VCR-based computations via a multi-armed bandit (MAB) process (e.g., MAB decision process 122) that employs an enhanced Linear Thompson Sampling (LTS) selection algorithm (e.g., LTS selection algorithm 124). Computational system 100 includes at least a computing device 102 and a set of physical computational resources (PCRs) 130, in communication via a communication network 110. The set of PCRs 130 includes a set of physical computing devices 132, a set of physical networking devices 134, and a set of physical storage devices 136. In other embodiments, the set of PCRs 130 includes additional and/or alternative physical computational resources.

The computing device 102 implements a virtualized computational resource (VCR) controller 120. The VCR controller 120 employs various PCRs included in the set of PCRs 130 to implement virtualized computational services (VCS) 140 (e.g., cloud and/or web-based computational services). The VCS 140 includes one or more sets of VCRs. For instance, the VCS 140 includes at least a first set of VCRs 142 and a second set of VCRs 144. Each set of VCRs includes one or more containers, virtual machines (VMs), virtual storage disks, virtual memory devices, virtual network devices, and the like. Each VCR in a set of VCRs is implemented by various PCRs included in the set of PCRs 130. The VCR controller 120 is enabled to configure, operate, and manage each set of VCRs included in the VCS 140. To configure, operate, and/or manage a set of VCRs (e.g., first set of VCRs 142 or second set of VCRs 144), VCR controller 120 employs a MAB decision process 122 that employs an enhanced LTS selection algorithm 124, as discussed in the various embodiments.

The VCR controller 120 is generally responsible for configuring, deploying, managing, operating, and decommissioning virtualized computational services 140. Various embodiments of VCR controller 120, including internal components and/or modules, are discussed in conjunction with at least FIG. 1B. However, briefly, here, one of the responsibilities of VCR controller 120 is to allocate and/or distribute resources from the set of physical computational resources 130 to the various sets of virtualized computational resources of virtualized computational services 140 (e.g., first set of virtualized computations resources 142 and first set of virtualized computations resources 144). As discussed throughout, VCR controller employs the enhanced MAB decision process 120, which in turn, employs the enhanced LTS selection algorithm 124 to select a configuration for each set of virtualized computational resources of virtualized computational services 140. Details of the operations of VCR controller 120, including the details of both the enhanced MAB decision process 122 and the LTS selection algorithm 124 are discussed throughout, including at least in conjunction with FIG. 1B, pseudo-code 200 of FIG. 2 and the various methods of FIGS. 3-4B.

Communication network 110 is a general or specific communication network and directly and/or indirectly communicatively couples to client computing device 102 and server computing device 104. Communication network 110 is any communication network, including virtually any wired and/or wireless communication technologies, wired and/or wireless communication protocols, and the like. Communication network 110 is virtually any communication network that communicatively couples a plurality of computing devices and storage devices in such a way as to computing devices to exchange information via communication network 110.

Example Embodiment of a Virtualized Computational Resource Controller

Figure 1B:
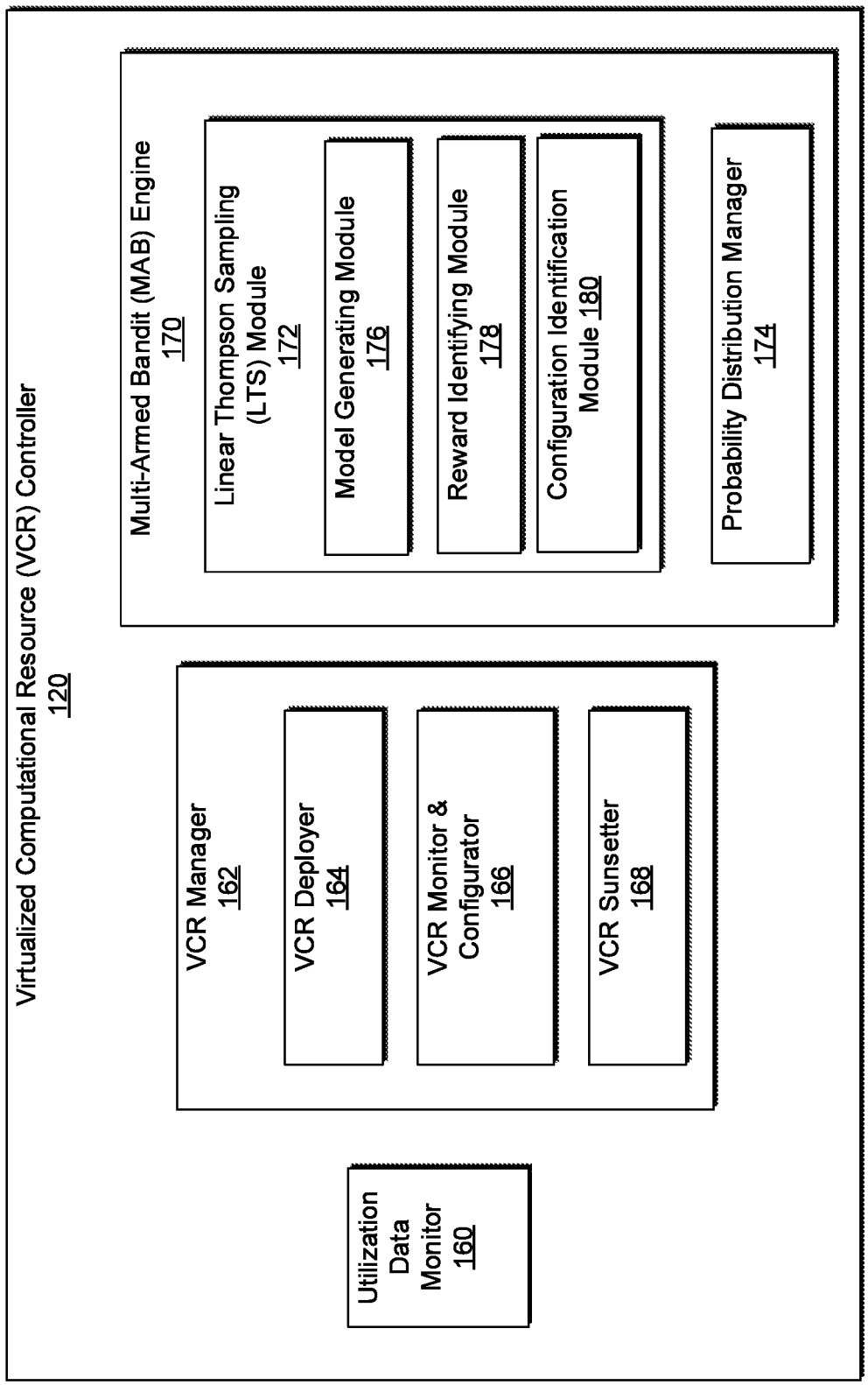
FIG. 1B illustrates an enhanced virtualized computational resource controller that is consistent with the various embodiments presented herein.

FIG. 1B illustrates an enhanced virtualized computational resource (VCR) controller 120 that is consistent with the various embodiments presented herein. Various embodiments of VCR controller 120 implement various operations and/or functionalities, such as but not limited to configuring, operating, and managing VCRs that implement a set of virtualized computational services (VCS) (e.g., VCS 140 of FIG. 1A). To configure, operate, and/or manage a set of VCRs (e.g., first set of VCRs 142 or second set of VCRs 144 of FIG. 1A), VCR controller 120 employs a multi-armed decision process bandit (MAB decision process 122 of FIG. 1A) that employs an enhanced linear Thompson sampling (LTS) selection algorithm (e.g., LTS selection algorithm 124 of FIG. 1A), as discussed in the various embodiments. To carry out such responsibilities, functions and/or operations, VCR controller 120 includes various internal components and/or modules, including but not limited to utilization data monitor 160, VCR manager 162, and/or MAB engine 170. To perform its responsibilities, functions and/or operations, VCR manager 162 includes various internal components and/or modules, including but not limited to VCR deployer 164, VCR monitor and configurator 166, and VCR sunsetter 168. To perform its responsibilities, functions and/or operations, MAB engine 170 includes various internal components and/or modules, including but not limited to LTS module 172 and probability distribution manager 174.

Utilization data monitor 160 is generally responsible for acquiring, monitoring, processing, analyzing, and storing (e.g., logging) utilization data as discussed throughout. Utilization data may be generated while one or more sets of VCRs (e.g., first set of VCRs 142 and/or second set of VCRs 144 of FIG. 1) provides virtualized computations services (e.g., virtualized computational services 140 of FIG. 1A).

Utilization data monitor 160 is also enabled to detect events within the monitored utilization data that indicates or triggers a reconfiguration event for a set of VCRs. In some embodiments, utilization data monitor 160 receives utilization data. In such embodiments, utilization data monitor 160 scans the received utilization data to identify a time series that that indicates a number of processing units allocated to a set of VCS. The utilization data monitor 160 scans the utilization data to identify a time series indicating a number of scaling events associated with the set of VCRs. The utilization data monitor 160 generates a time series that indicates a difference between the number of allocated processing units and a number of utilized processing units of the set of VCRs. The utilization data monitor 160 generates a time-averaged time series of the difference between the actual number of allocated processing units and the number of utilized.

The VCR manager 162 is generally responsible for receiving requests for virtualized computational services (e.g., a request for a set of VCRs), configuring the requested set of VCRs, deploying the requested set of VCRs, monitoring the deployed set of VCRs, reconfiguring the monitored set of VCRs, and retiring the set of VCRs. More specifically, the VCR deployer 164 is generally responsible for receiving a request for a set of VCRs (or a request to provide virtualized computational services implemented by the set of VCRs). VCR deployer 164 also deploys (e.g., initializes, allocates, and launches) the requested set of VCRs. The VCR monitor and configurator 166 is generally responsible for configuring and monitoring the requested set of VCRs. In the event a reconfiguration event and/or trigger is detected (e.g., via the utilization data monitor), the VCR monitor and configurator 166 is also responsible for reconfiguring the set of VCRs. For example, the VCR monitor and configurator 166 will re-scale (e.g., up-scale or down-scale) a set of VCRs. The VCR sunsetter 168 is generally responsible for retiring (e.g., decommissioning, terminating, and/or sunsetting) the deployed set of VCRs once their services are no longer required.

The MAB engine 170 is generally responsible for implementing a MAB decision process (e.g., MAB decision process 122 of FIG. 1A), when configuring and/or reconfiguring the set of VCRs. More specifically, the MAB engine 170 is generally responsible for selecting a configuration for a reconfiguration, e.g., select an updated configuration) for the set of VCRs. In various embodiments, the MAB engine 170 may perform a linear Thompson sampling (LTS) selection algorithm. The MAB engine 170 is also responsible for updating the reward for a configuration based on the analysis of the utilization data.

In one embodiment, the MAB engine 170 includes a linear Thompson Sampling (LTS) module 172 and a probability distribution manager 174. The LTS module 172 is generally responsible for implementing the LTS selection algorithm (e.g., LTS selection algorithm 124 of FIG. 1A), for example, when implementing the MAB decision process. The probability distribution manager 174 is generally responsible for managing various statistical distributions generated during the MAP decision process.

As shown, the LTS module 172 can include a model generating module 176, a reward identifying module 178, and a configuration identification module 180. Any number of modules can be used to support the functionality described herein.

The model generating module 176 is generally configured to generate and/or update reward models. As described herein, a reward model refers to (deterministic or stochastic) function or mapping, that maps an input configuration to an "expected" reward metric for the configuration. That is, the reward model estimates or predicts a (performance) reward if the set of VCRs were to be deployed with the input configuration. The reward metric indicates an efficiency in the distribution and/or allocation of the physical computational resources to the set of VCRs. In various embodiments, a reward model includes a set of coefficients, components, or parameters. A reward model includes, or is based on, a set of statistical distributions that are generated via monitoring utilization data for sets of VCRS that were deployed via the various configurations in the set of possible configurations. In some embodiments, each statistical distribution from the set of statistical distributions corresponds to a separate coefficient of the set of coefficients. A particular reward model is instantiated and/or generated by sampling a coefficient from each of the respective statistical distributions. Thus, generating an instantiation of a reward. The samples from the distributions are employed for the instantiation of the reward model. The set of coefficients includes coefficients components, and/or parameters of a tensor object (e.g., a vector, a matrix, or a higher order tensor). In embodiments, the reward model is a linear model. That is, the predicted expected reward is a linear function that linearly combines the set of coefficients with the vector representation of the input configuration.

The model generating module 176 can generate an initial reward model and, thereafter, update the reward model based on utilization data corresponding with deployed VCRs. A reward model can be generated and/or updated based on sampling a set of statistical distributions, wherein each statistical distribution corresponds to a separate coefficient of the reward model. As described herein, in accordance with selecting a particular configuration, the model generating module 176 can update the reward model using data corresponding with VCRs deployed using the particular configuration. In this regard, upon deploying a particular configuration, utilization data that corresponds to the set of VCRs being operated in accordance with such a configuration is obtained and used to determine an observed reward for the particular configuration (e.g., via the model generating module 176). The observed reward can then be used to update the set of statistical distributions (e.g., via the model generating module 176 and/or probability distribution manager 174). The model generating module 176 can then sample such updated statistical distributions and use such a sampling to update the reward model.

The reward identifying module 178 is generally configured to identify rewards, such as expected rewards. In this regard, the reward identifying module 178 can identify or estimate an expected reward for each configuration of a set of configurations. That is, the reward model estimates or predicts a (performance) reward if the set of VCRs were to be deployed with the input configuration. The reward metric indicates an efficiency in the distribution and/or allocation of the physical computational resources to the set of VCRs.

In embodiments, estimating the expected reward for a configuration of the set of configurations is based on the reward model and a vector representation of the configuration. Each configuration of the set of configurations corresponds to a candidate allocation of the set of VCRs. In various embodiments, a reward model includes a set of coefficients, components, or parameters. In one embodiment, expected rewards (or updated expected rewards) are estimated for each configuration of a set of configurations based on the reward model (or updated reward model) and the vector representation of the configuration.

The configuration identifying module 180 is generally configured to identify or select a configuration. In embodiments, a configuration of a set of configurations is selected and/or identified based on the expected reward for each of the configurations of the set of configurations. In some embodiments, a stochastic or deterministic algorithm employs the value for a current estimate of each of the rewards of the set of rewards to select a configuration from the set of configurations. As can be appreciated, in some cases, the configuration identification model 176 select a configuration based on updated expected rewards (e.g., determined via an updated reward model). Each configuration of a set of configurations, from which a configuration is selected, corresponds to a candidate allocation of the computational resources for the set of VCRs. In various embodiments, each configuration of the set of configurations includes and/or indicates an initial number of processing devices (or cycles) of the computing resources that are provided to (or allocated for) the set of VCRs when the set of VCRs is launched, re-scaled, and/or re-configured. In some embodiments, each configuration of the set of configurations includes and/or indicates a lower-utilization threshold indicating a first condition that triggers a scale-up event for the first set of VCRs when implementing the requested application. In at least one embodiment, each configuration of the set of configurations includes and/or indicates an upper-utilization threshold indicating a second condition that triggers a scale-down event for the first set of VCRs when implementing the application. Each configuration of the set of configurations is encoded in a feature vector.

In some embodiments, the configuration identification module 180 selects a configuration from a set of configurations based on a ranking of the set of reward metrics, an exploration-exploitation balancing policy, and a stochastically-determined value. In various embodiments, the selection of the configuration is made via a multi-armed bandit (MAB) process, where the set of rewards is the set of rewards of the MAB process. In such embodiments, each configuration of the set of configurations corresponds to a separate arm of the multi-arms. Selection of a configuration may be based on any type of data. For example, in some cases, selecting a configuration is based on selecting the configuration with the highest corresponding predicted reward. As described, aspects of the LTS module 172 can be performed in an iterative manner, for example, based on analysis of ongoing utilization data.

The probability distribution manager 174 is generally configured to manage probability distributions, for example, used by the LTS module, and/or portions thereof. For example, upon deploying a particular configuration, utilization data that corresponds to the set of VCRs being operated in accordance with such a configuration is obtained and used to determine an observed reward for the particular configuration. The probability distribution manager 174 can use the observed rewards to update the set of statistical distributions, which can then be used by the model generating module 176, or other component, to sample such updated statistical distributions and use such a sampling to update the reward model. The probability distribution manager 174 can communicate with the utilization data monitor 160, the VCR manager 162, and/or the LTS module to obtain and/or provide information.

Multi-Armed Bandit Framework for Virtualized Computational Resources

The details for framing a task of configuring a set of virtualized computational resources (VCRs) within the context of an enhanced multi-armed bandit (MAB) algorithm will now be discussed. To reduce the complexity of the conversation, the following discussion is focused on the case where the set of VCRs includes one or more containers. However, it should be noted that the framing is applicable to a more generalized set of VCRs, including those that include one or more virtual machines (VMs), one or more virtual storage disks, one or more virtual memory devices, one or more virtual network devices, and the like. For instance, the framework is generalized to include these additional and other VCRs by including components in the configuration feature vectors and/or additional terms in the below discussed reward function. Furthermore, this framework is generalized to virtually any resource allocation problem by appropriate design of configuration feature vectors and reward functions. Additionally details regarding casting a resource allocation problem in the context of a MAB algorithm are found in U.S. application Ser. No. 17/443,928, which as mentioned above, the contents of which are incorporated herein in their entirety.

The configuration of a set of VCRs is modeled as an optimization problem, solved via an enhanced MAB process that balances the exploration vs. exploitation of the configuration space. The sampling of the configuration space is performed via an enhanced LTS algorithm. Each possible configuration of a set of configurations (which spans the configuration space) applicable to a set of VCRs is an arm for the multi-armed bandit. Furthermore, each configuration/arm is encoded in an n-tuple. The n-tuple is treated as a feature vector for the corresponding configuration/arm. In the case where the set of VCRs includes one or more containers, a component of the configuration n-tuple (or feature vector) is referred to as cpu_num, which indicates the number of physical central processing devices (CPUs) allocated to a container in the set of VCRs. Two other components of the n-tuple (or feature vector) includes scal_lo and scal_hi. The value of scal_lo indicates a low-watermark for the CPUs of the container and the value of scale_hi indicates a high watermark for the CPUs of the container. These low and high watermark values indicate the utilization for each CPU of the container that triggers a scale-up or a scale-down event for the set of VCRs. Thus, each configuration of the set of configurations is encoded in the n-tuple $x=(cpu\_num, scale\_lo, scal\_hi)$. The n-tuple (x) for a configuration is employed as a feature vector (e.g., a column vector) for the configuration, $x \in \mathbb{R}^{1 \times D}$, D=3. In embodiments that include other parameters in the configuration, $D \geq 3$. For example, configuration n-tuple can also include other parameters such as memory, minimum and maximum containers, scaling factors, and the like.

A 2-tensor (e.g., a matrix referred to as X) is formed encoding the feature vectors for the set of configurations, where each row of the matrix includes a row vector (e.g., $x^T$) encoding a separate configuration of the set of configurations. If there are l possible values for scale_lo, h possible values for scale_hi, and c possible values for cpu_num, then the matrix X is includes $r=l \times h \times c$ rows. Accordingly, in this embodiment, $X \in \mathbb{R}^{r \times D}$.

During the deployment of a set of VCRs subject to a particular configuration of the set of configurations, a value of a reward function (for the particular configuration) is determined from analyzing utilization data generated during the deployment of the set of VCRs. In the container embodiment, the reward function is based on the utilization and number of scale-up events occurring during the deployment. The reward is calculated from a sum of two terms, namely, resource wastage (to estimate utilization) and the number of times the set of VCRs undergoes re-scaling event (e.g., a scale-up or a scale-down event) based on its usage and configuration. The resource wastage is the difference between total allocated CPUs and total used CPUs during the deployment. The number of scaling events refers to total number of re-scaling events that occurred during deployment (e.g., the sum of the number of scale-up events and the number of scale-down events). Note that a scale-up event occurs when the CPU utilization (as encoded in the utilization data) exceeds the scale_hi configuration threshold. A scale-down event occurs when the CPU utilization (as encoded in the utilization data) falls below the scale_lo configuration threshold. Greater performance is achieved via a reduction of each term: a first term that scales with the resource wastage and a second term that scales with the number of scaling events made by the cluster manager on behalf of the service during a given interval. Thus, the reward function scales as the inverse of these two terms.

In various embodiments, the reward function is modeled as a linear function of the components of the configuration's feature vector. The reward function scales as the negative of the weighted sum of the utilization and scaling factors. The reward function is scaled such that the values of the reward are constrained to be between −1 and 1. A non-limiting example of such a reward function is shown below. In the below expression, the reward function (e.g., f(t)) is written as a function of time (t). In practice, time is discretized into time bins, where the size of each time bin (or interval) is scaled depending on the computational needs. Accordingly, the reward function (and each included term or factor) is characterized by an integer index (rather than the continuous variable t), where the index corresponds to the time interval or time bin. In the below expressions, $\tilde{w}(t)$ represents the CPU utilization (or waste) term and $\tilde{s}(t)$ represents the scaling (or overhead) term. The coefficients $\omega_{waste}$ and $\omega_{overhead}$ are the weights for the utilization and scaling terms, respectively. Also in the below expression, w(t) is the measured CPU utilization, as a function of time, and s(t) is the total number of scaling events, as a function of time. The coefficients $w_{min}$ and $w_{max}$ represent the minimum and maxim values (observed in the utilization data) for w(t). Additionally, the coefficients s and $s_{max}$ represent the minimum and maxim values (observed in the utilization data) for s(t). The exemplary reward function is as follows:

$$f(t) = 1 - (\omega_{waste} * \tilde{w}(t) + \omega_{overhead} * \tilde{s}(t)), \text{ where}$$

$$\tilde{w}(t) = \frac{w(t) - w_{min}}{w_{max} + w_{min}},$$

$$\tilde{s}(t) = \frac{s(t) - s_{min}}{s_{max} + s_{min}}, \text{ and}$$

$$w(t) = \text{allocated}_{cpus}(t) - \text{used\_cpus}(t).$$

In some embodiments, the reward function includes additional and/or alternative terms. For instance, the reward function could include a term encoding whether one or more service latency/request (e.g., number of requests services per unit of time) requirements were satisfied.

As noted above, the configuration task is modeled as a multi-armed bandit (MAB) problem, where each possible configuration corresponds to an arm. The performance of the set of VCRs (as encoded in utilization data received during feedback from the deployed set of VCRs) is employed to calculate the reward for a specific configuration The reward is developed as the accuracy of the system during time t, which is a continuous variable, but is discretized into time intervals or bins. As discussed above, at time t (which could be an integer index for discrete time bins), the configuration has features encoded in the column feature vector: $x_t \in \mathbb{R}^{1 \times D}$, where D is the dimensionality of the configuration feature vector. In the container example discussed herein, D=3.

In the embodiments, a reward model is learned, via an enhanced Linear Thompson Sampling (LTS) algorithm to estimate the reward at time t: $y_t$. In various embodiments, the reward model is a linear model with the configuration feature vector that includes a set of learned coefficients, encoded in a column vector: $\theta \in \mathbb{R}^{D \times 1}$, such that $f_t \approx y_t = \theta \cdot x_t$.

Linear Thompson Sampling Algorithms for Virtualized Computational Resources

Figure 2:
FIG. 2 shows pseudo-code for the enhanced multi-armed bandit decision process and an enhanced Linear Thompson Sampling algorithm employed by the various embodiments.

The details of an enhanced Linear Thompson Sampling (LTS) algorithm for selection and feedback for configuring a set of virtualized computational resources (VCRs) will now be discussed. FIG. 2 shows pseudo-code 200 for the enhanced multi-armed bandit (MAB) decision process (e.g., MAB decision process 122 of FIG. 1A) and LTS algorithms (e.g., LTS selection algorithm 124 of FIG. 1A), employed by the various embodiments. More specifically, pseudo-code is implemented by a MAB engine (e.g., MAB engine 170 of FIG. 1B). The MAB engine employs a LTS module (LTS module 172 of FIG. 1B) and a probability distribution manager (e.g., probability distribution manager 174 of FIG. 1B) to implement at least portions of pseudo-code 200. Pseudo-code 200 includes a for-loop encoded in lines 202-218 that provide a control loop (with feedback) for managing and/or operating a set of VCRs via an enhanced MAB process that employs an enhance LTS algorithm to balance exploration vs. exploitation over the configuration space. Each iteration around the for-loop is characterized by an integer index (t) corresponding to a time step.

Pseudo-code 200 is implemented by a VCR controller, e.g., VCR controller 120 of FIG. 1A and/or components of the VCR controller (e.g., MAB engine 170, LTS module 172, and probability distribution manager 174 of FIG. 1B). The MAB engine includes a learning (or bandit) agent. At each time (e.g., during each iteration of the for-loop in pseudo-code 200, which is indexed by the integer index t), the learning agent at least approximately optimizes the configuration as follows. The agent receives possible resource allocation configurations (e.g., the set of configurations) with their features (e.g., each configuration encoded in a row feature vector x). Then, by the model (e.g., $\theta$), the agent recommends the best configuration (e.g., as determined by the dot product which approximates the expected reward: $y_t = \theta \cdot x_t$) from the possible configurations. Note that the particular configuration employed at time interval index t is referred to as $x_t$ (with the index being indicated as a subscript) and the predicted reward at time-interval t is referred to as $y_t$ (with the index being indicated as a subscript). The VCR controller deploys the set of VCRs with the recommended configuration and provides the feedback to the agent, based on which the model ($\theta$) is updated accordingly. As discussed below, the model is updated based on the feedback (e.g., additional utilization data) via Bayes' Theorem.

LTS algorithms employ one or more statistical distributions to model a reward function. Such statistical modeling accounts for the stochastic nature of performance within an environment. Accordingly, to model the statistical nature of the performance of a set of VCRs, the reward function model is based on one or more statistical distributions (e.g., a normal or Gaussian distribution). A normal or Gaussian distribution is notated as $\mathcal{N}(\mu, \sigma_2)$, where $\mu$ indicates the mean and $\sigma$ indicates the standard deviation of the normal distribution. When additional observations of the performance are observed, the statistical model is updated via Bayes' Theorem. In embodiments where a normal distribution is employed as the underlying distribution for the LTS algorithm, conjugate priors are employed to simplify the calculation of the posterior probabilities. In the following discussion, $\theta$ refers to the posterior model (updated via the utilization data) and $\theta^*$ refers to the conjugate prior for the model. The stochastic reward function is modeled as a sample from the distribution via the following expression:

$$y_t \sim \mathcal{N}(\theta^* \cdot x_t, \sigma^2).$$

The conjugate prior is sampled from another normal distribution, $\mathcal{N}(0, \lambda^{-1}I_D)$, where $\lambda^{-1}I_D$ serves as the covariance matrix (e.g., $I_D$ being the D dimensional identify matrix). Pseudo-code 200 indicates that a and A are supplied as input hyper-parameters. Furthermore, the total number of steps (T) (e.g., the number of iterations around the for-loop) is supplied as an input parameter. During each iteration of the for-loop of pseudo-code 200, the model parameters are sampled from the posterior. A configuration 2-tensor (e.g., a matrix) is generated and/or updated (e.g., appended) at each step, $X_t = (x_0^T, x_1^T, x_2^T, \ldots, x_t^T)^T \in \mathbb{R}^{t \times D}$, where $x_t \in \mathbb{R}^{1 \times D}$ is the row vector encoding the configuration selected at step t. The 2-tensor $X_t$ is referred to as a selected configuration tensor and/or matric because it encodes the (via a feature vector) configuration selected (at line 214) for each iteration of the for-loop. Line 204 of pseudo-code 200 shows the appending/updating of this matrix at each step, based on the selection of the configuration from the previous step. A reward 1-tensor (e.g., a column vector) is generated and/or updated (e.g., appended) at each step, $Y_t = (y_0, y_1, y_2, \ldots, y_t)^T \in \mathbb{R}^{t \times 1}$, where $y_t \in \mathbb{R}$ is the scalar reward predicted for the configuration is selected at step t. Line 206 of pseudo-code 200 shows the appending/updating of this reward vector at each step. In various embodiments, the reward vector $(Y_t = (y_0, y_1, y_2, \ldots, y_t)^T)$ is referred to as a set of rewards. In the algorithm, $x_0$ is a random chosen configuration and $y_0$ is the performance by running the service with configuration $x_0$. In some embodiments, because the rewards are observed in the utilization data, the reward vector is referred to as an observed reward column vector. As shown in line 212 of pseudo-code 200, the posterior is sampled at each step via the normal distribution:

$$\theta_t \sim \mathcal{N}(\overline{\theta}_{t-1}, S_{t-1}) \in \mathbb{R}^{D \times 1},$$

where the mean is $\overline{\theta}_{t-1} = \sigma^{-2} S_{t-1} X_{t-1}^T Y_{t-1} \in \mathbb{R}^{D \times 1}$ (encoded as a column vector) and the covariance matrix is $S_{t-1} = (\sigma^{-2} X_{t-1}^T X_{t-1} + \lambda I_D)^{-1} \in \mathbb{R}^{D \times D}$. Lines 208 and 210 of pseudo-code 200 show the calculation on the mean column vector and covariance matrix. At line 214 of pseudo-code 200, the agent optimizes the configuration or recommends the configuration that generates the largest predicted reward via the following:

$$x_t = \operatorname{argmax}_{x \in all\ configurations\ at\ t}(x_t \cdot \theta).$$

The VCR controller then deploys the set of VCRs with the configuration selected at line 216 of pseudo-code 200. After deploying the setoff VCRs, the VCR controller then monitors the utilization data to observe resulting reward, $y_t = f(t)$, calculated from the utilization data. Based on the observed rewards, the posteriors for the model ($\theta$) are updated for the next iteration through the for-loop.

Figure 3A:
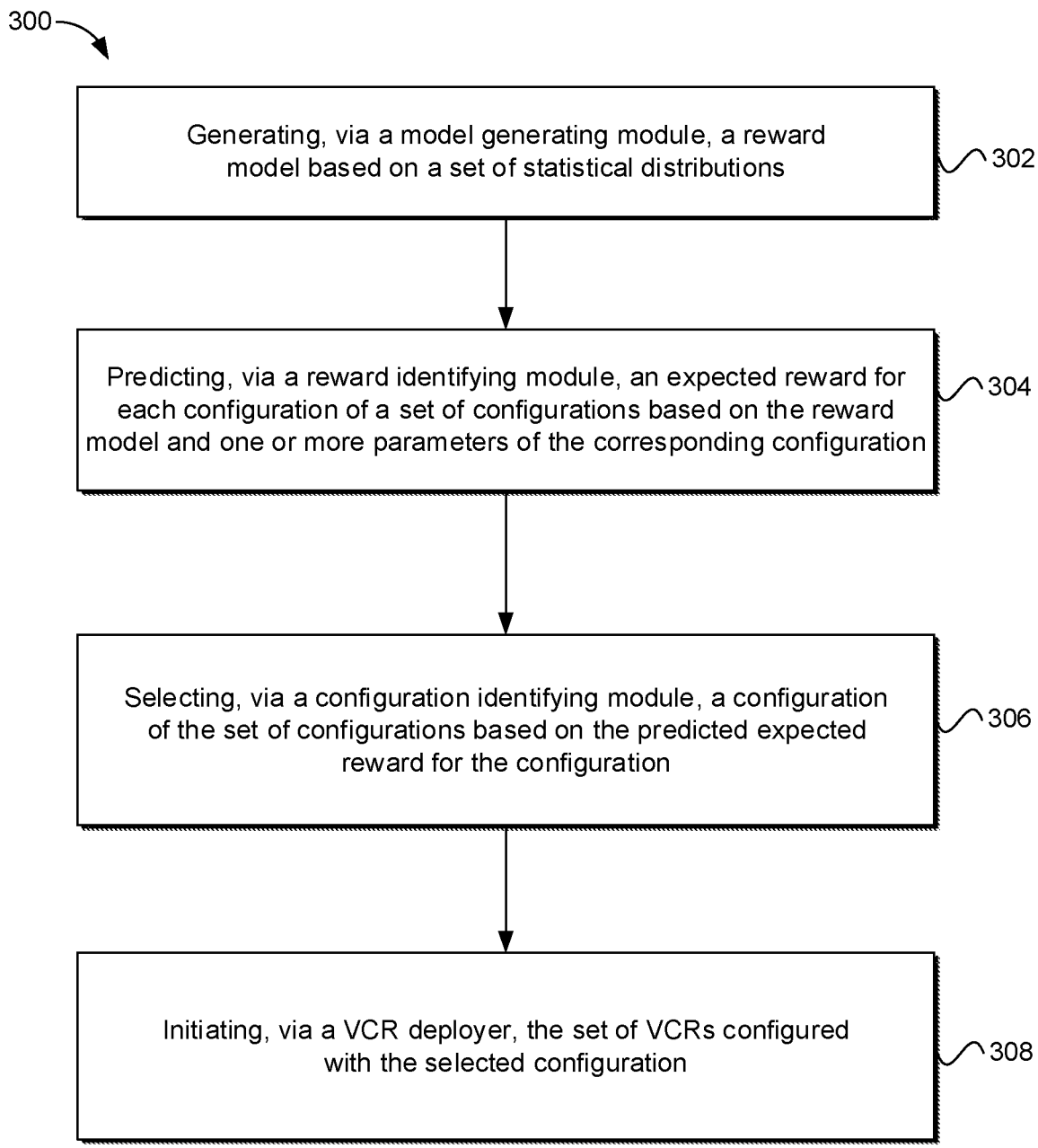
FIG. 3A illustrates one embodiment of a method for the efficient and adaptive allocation of resources for virtualized computation via multi-armed bandit, in accordance with embodiments described herein.
Figure 3B:
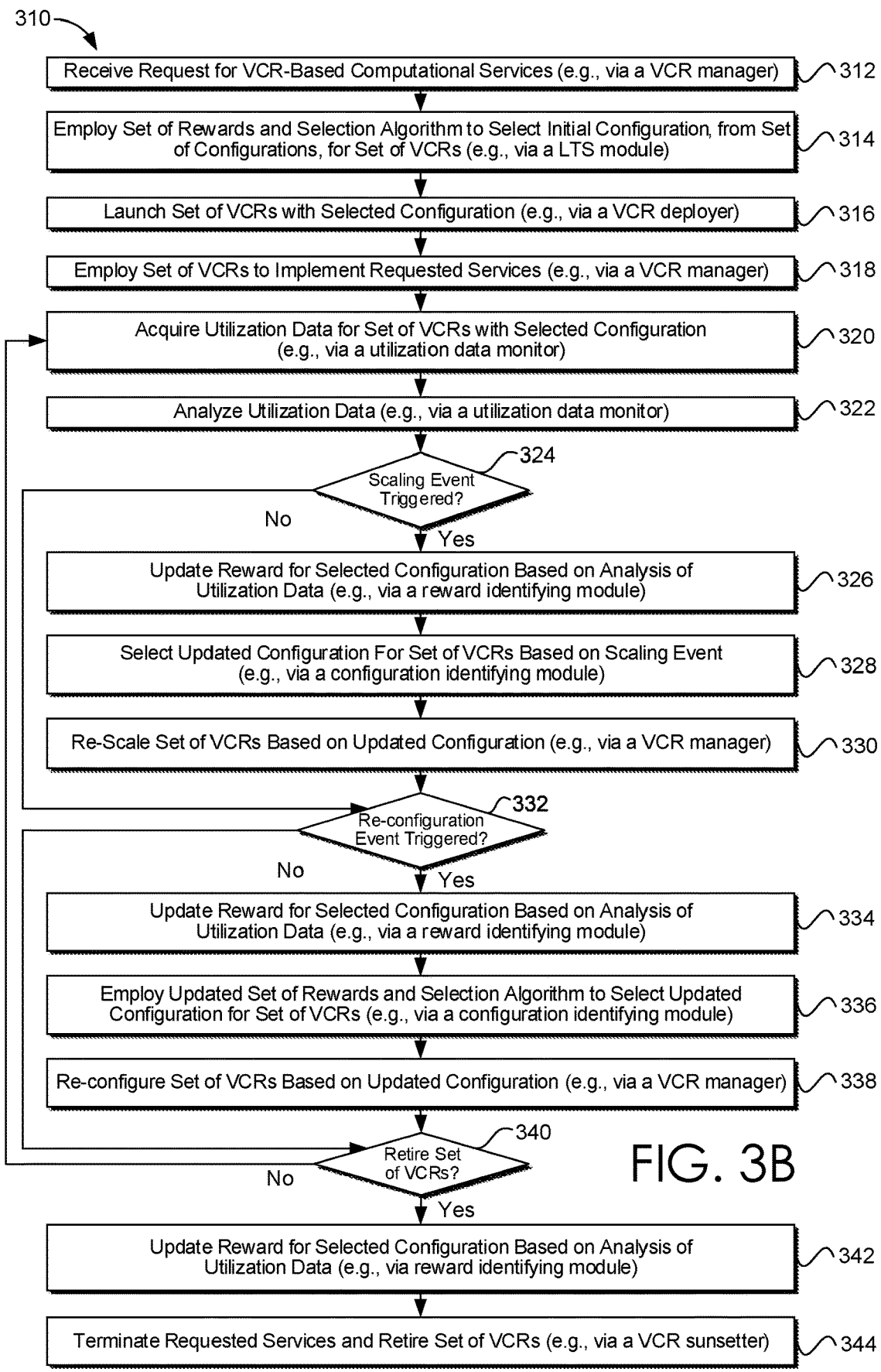
FIG. 3B illustrates one embodiment of a method for the efficient and adaptive allocation of resources for virtualized computation via multi-armed bandit, in accordance to the various embodiments.
Figure 4A:
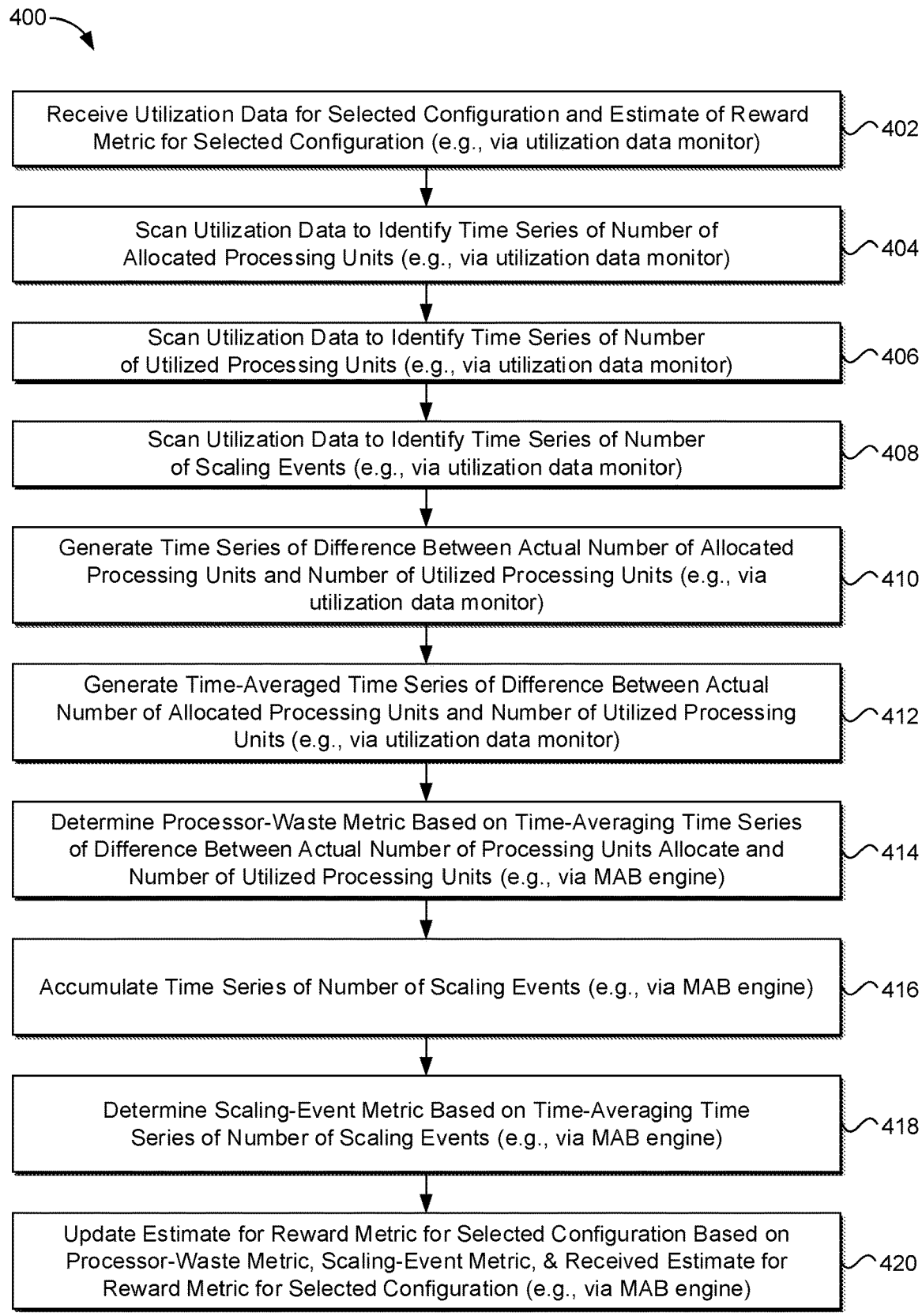
FIG. 4A illustrates one embodiment of a method for analyzing utilization data, in accordance with the various embodiments.
Figure 4B:
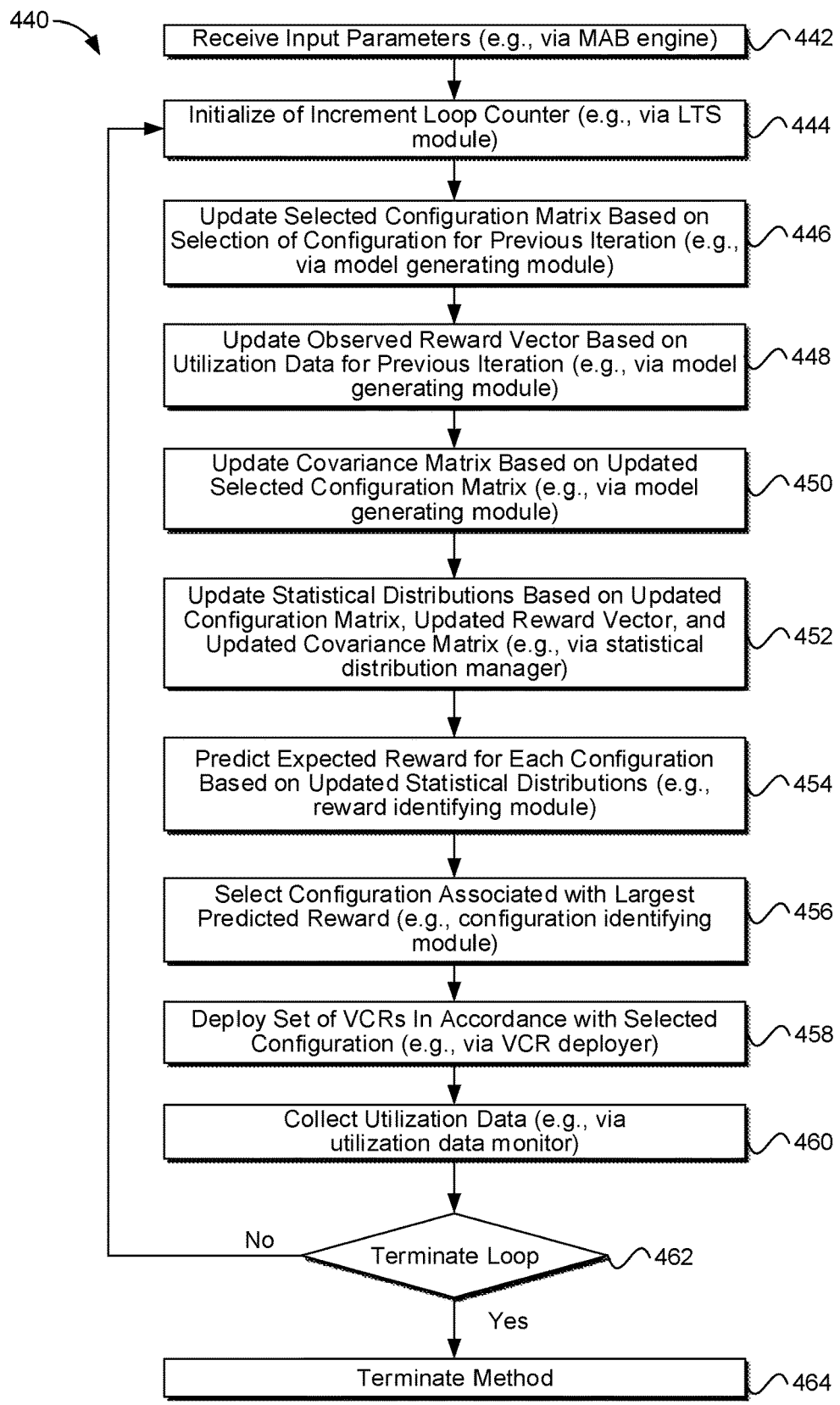
FIG. 4B illustrates one embodiment of a method for the efficient and adaptive allocation of resources for virtualized computation via a Linear Thompson Sampling algorithm, in accordance to the various embodiments
Figure 5:
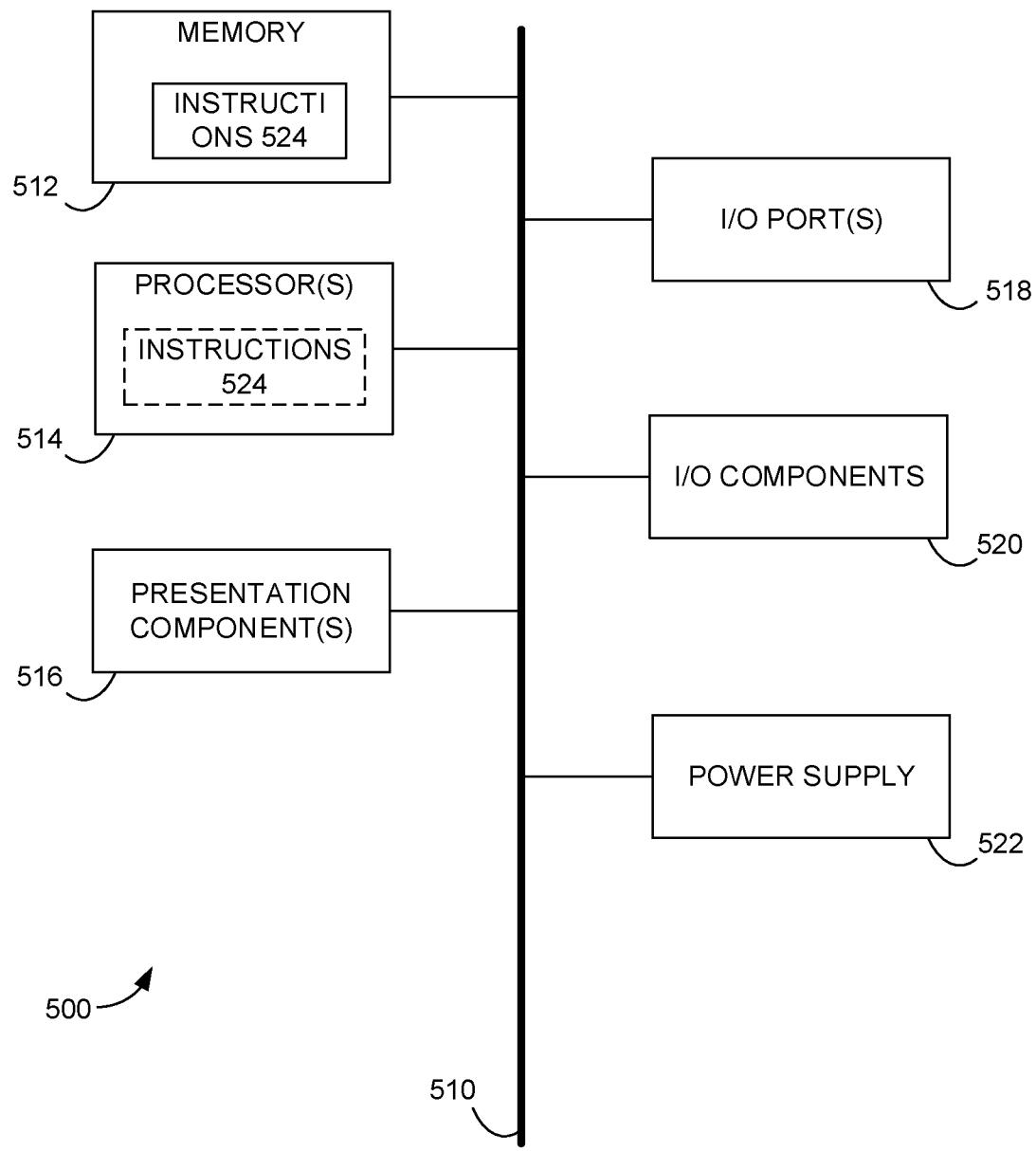
FIG. 5 is a block diagram of an example computing device in which embodiments of the present disclosure are employed.

Generalized Processes for Operating a Set of Virtualized Computational Resources Processes 300-400 of FIGS. 3A-4B, or portions thereof, are performed and/or executed by any computing device, such as but not limited to, client computing device 102 of FIG. 1A and/or computing device 500 of FIG. 5. Additionally, a virtualized computational resource (VCR) controller, such as but not limited to VCR controller 120 of FIG. 1A performs and/or executes at least portions of processes 300, 400, and 440 of FIGS. 3, 4A, and 4B respectively.

FIG. 3A illustrates an embodiment of a method 300 for the efficient and adaptive allocation of resources for virtualized computation via multi-armed bandit (MAB), in accordance with various embodiments described herein. Initially, at block 302, a processing device implementing the present disclosure generates a reward model based on a set of statistical distributions. In embodiments, a reward model is generated in response to receiving a request to launch a set of VCRs. Such a reward model generation may be performed via a model generating module, such as model generating module 176 of FIG. 1B. At block 304, a processing device implementing the present disclosure predicts an expected reward for each configuration of a set of configurations. Such expected rewards can be based on the reward model and one or more parameters of the corresponding configuration. The expected reward indicates an efficiency in distribution or allocation of physical computation resources to the set of VCRs. Expected rewards can be predicted via a reward identifying module, such as reward identifying module 178 of FIG. 1B. At block 306, a processing device implementing the present disclosure selects a configuration of the set of configurations based on the predicted expected reward for the configuration. In embodiments, the expected rewards associated with each of the configurations are analyzed to select a configuration, such as the configuration with a highest or greatest expected reward. Such a configuration selection may be performed by a configuration identifying module, such as configuration identifying module 180 of FIG. 1B. Thereafter, at block 308, a processing device implementing the present disclosure initiates the set of VCRs configured with the selected configuration. Such an initiation may be performed by a VCR deployer, such as VCR deployer 164 of FIG. 1B.

FIG. 3B illustrates another embodiment of a method 310 for the efficient and adaptive allocation of resources for virtualized computation via multi-armed bandit (MAB), in accordance to the various embodiments. Method 310 is performed by a VCR controller, such as but not limited to VCR controller 120 of FIG. 1A. Method 312 implements one or more portions of pseudo-code 200 of FIG. 2, method 400 of FIG. 4A, and/or method 440 of FIG. 4B. Method 312 begins at block 312, where a request is received. The request is a request to initiate or launch VCR-based computational services. The requested services includes implementing an application and/or performing one or more workloads. For example, the request is a request to run an application to perform and/or process a workload. The request indicates an application to be implemented via a set of VCRs (e.g., first set of VCRs 142 and/or second set of VCRs 144 of FIG. 2) that includes one or more virtual machines (VMs), containers, virtual storage disks, virtual memory devices, virtual network devices, or the like. The request is transmitted by a client device that is a client to another computing device (client computing device 102 of FIG. 1A). The request is received by a VCR manager (e.g., VCR manager 164 of FIG. 1B) and/or a VCR deployer (VCR deployer 164 of FIG. 1B).

At block 314, a set of rewards (e.g., a reward vector $Y_t=(y_0, y_1, y_2, \ldots, y_t)^T \in \mathbb{R}^{t \times 1}$) and a selection algorithm (e.g., Linear Thompson Sampling (LST)) is employed to select an initial configuration from a set of configurations to implement the selected configuration. A MAB engine (e.g., MAD engine 170 of FIG. 1B) selects the initial configuration. A LTS module (e.g., LTS module 172 of FIG. 1B) implements the LTS selection algorithm (e.g., LTS selection algorithm 124 of FIG. 1A). Various portions of pseudo-code 200 of FIG. 2 are implemented to select a configuration based on an enhanced LST algorithm. Each configuration of the set of configurations corresponds to a candidate allocation of the computational resources for the set of VCRs. In various embodiments, each configuration of the set of configurations includes and/or indicates an initial number of processing devices (or cycles) of the computing resources that are provided to (or allocated for) the set of VCRs when the set of VCRs is launched, re-scaled, and/or re-configured. In some embodiments, each configuration of the set of configurations includes and/or indicates a lower-utilization threshold indicating a first condition that triggers a scale-up event for the first set of VCRs when implementing the requested application. In at least one embodiment, each configuration of the set of configurations includes and/or indicates an upper-utilization threshold indicating a second condition that triggers a scale-down event for the first set of VCRs when implementing the application. Each configuration of the set of configurations is encoded in a feature vector.

The selection algorithm could include, but is not limited to an epsilon-greedy algorithm, a softmax algorithm, an upper confidence bound (UCB) algorithm, Thompson sampling, explore-then-commit, an exponential-weight algorithm (e.g., EXP3) for exploration and exploitation, and the like. In various embodiments, the selection algorithm could include any combination of an epsilon-greedy algorithm, a Boltzmann exploration algorithm, an upper confidence bounds (UCB) algorithm, explore-then-commit, or an exponential-weight algorithm for exploration and exploitation. In at least one embodiment, the selection algorithm is an LST algorithm.

In some embodiments, the selection algorithm selects a configuration from the set of configurations based on a ranking of the set of reward metrics, an exploration-exploitation balancing policy, and a stochastically-determined value. In various embodiments, the selection of the configuration is made via a multi-armed bandit (MAB) process, where the set of rewards is the set of rewards of the MAB process. In some embodiments, a bandit agent implemented by the VCR controller is employed to select the initial configuration of the set of configurations. In such embodiments, each configuration of the set of configurations corresponds to a separate arm of the multi-arms. The set of rewards is a set of reward metrics. Each reward of the set of rewards is a predicted reward based on sampling one or more statistical distributions. For example, each reward in the set of rewards is generated via line 212 of pseudo-code 200 of FIG. 2. Thus, the rewards are predicted from a linear model (e.g., θ) and, as discussed below, a feature vector for the configuration corresponding to the reward.

Each reward (metric) of the set of rewards (or reward metrics) corresponds to a separate configuration of the set of configurations. There is a one-to-one mapping between the configurations of the set of configurations and the rewards of the set of rewards. Each reward of the set of rewards indicates a computational resource allocation efficiency associated with the corresponding configuration. Accordingly, the set of rewards indicates computational resource allocation efficiencies associated with the set of configurations. Selecting the configuration is based on selecting the configuration with the highest corresponding predicted reward (e.g., line 214 in pseudo-code 200).

At block 316, the set of VCRs is launched with the initially selected configuration. The VCR deployer launches the set of VCRs with the initially selected configuration. At block 318, the set of VCRs is employed to deploy and/or implement the requested services The VCR manager implements the requested services via deploying (or launching) the set of VCRs. For instance, the set of VCRs implements an application to perform and/or process a workload.

At block 320, utilization data (e.g., feedback data) is acquired for the set of VCRs providing the requested services in accordance with the selected configuration. A utilization monitor (e.g., utilization data monitor 160 of FIG. 1B) acquires the utilization data for the set of VCRs. The utilization data encodes a utilization of the allocation of the computational resources corresponding to the selected configuration when the set of VCRs implements the services. At block 322, the utilization data is monitored and/or analyzed. A utilization data monitor (e.g., utilization data monitor 160 of FIG. 1B) acquires, monitors, and/or analyzes the utilization data. Various embodiments of analyzing utilization data are discussed at least in conjunction with method 400 of FIG. 4. The analysis of the utilization data is enabled to detect one or more triggers for a scaling event for the set of VCRs providing the requested services. Such scaling triggers include triggers for scale-up events, as well as triggers for scale-down events. The scale-up events include increasing a number of containers, VMs, or other virtualized resources of the set of VCRs when the set of VCRs performs the requested services. In one embodiment, a scale-up event includes increasing a number of physical CPUs provided to the set of VCRs. The scale-down events include decreasing the number of resources provided to the set of VCRs. Such scaling events result in horizontal and/or vertical scaling of the set of VCRs. Such scaling events result in re-configuring the set of VCRs. The analysis of the utilization data is enabled to detect on or more triggers for a re-configuration event of the set of VCRs. Note that a scaling event is one type of re-configuration event, but the embodiments could include additional re-configuration events.

At decision block 324, it is determined whether a scaling event has been triggered via the analysis of the utilization data at block 312. The utilization data monitor monitors for and detects scaling event triggers. If a scaling event has been triggered, method 310 flows to block 326. Otherwise if a scaling event has not been triggered, the method 310 flows to decision block 332. At block 326, the set of rewards is updated. The set of rewards is updated by the MAB engine. More specifically, the reward (of the set of rewards) corresponding to the selected configuration (of the set of configurations) is updated based on the analysis of the utilization data. Various embodiments for updating a reward based on the utilization data for the reward are discussed at least in conjunction with the control loop 200 of FIG. 2 and method 400 of FIG. 4. At block 328, and in response to identifying and/or detecting a scaling event (triggered in the analysis of the utilization data), an updated configuration is selected from the set of configurations. The MAD engine selects the updated configuration. An MDP engine employs a MAB decision process (e.g., MAD decision process 122 of FIG. 1A) to select the updated configuration. The updated configuration is selected based on the scaling event (e.g., based on whether the scaling event is a scale-up event or a scale-down event and/or a scaling factor). In some embodiments, the updated configuration is based on an MDP (e.g., a MAB decision process) based on the set of rewards and the selection algorithm. Thus, the updated set of rewards and the selection algorithm are employed to select and updated configuration from the set of configurations. At block 330, the set of VCRs is re-scaled based on the updated configuration. The VCR manager is generally responsible for re-scaling the set of VCRs.

At decision block 332, it is determined whether a re-configuration event has been triggered via the analysis of the utilization data at block 322. If a re-configuration block has been triggered, then method 310 flows to block 334. Otherwise, if a re-configuration event has not been triggered based on the analysis of the utilization data, then method 310 flows to decision block 340.

At block 334, the set of rewards is updated based on the analysis of the utilization data. The MAB engine is generally responsible for updating the set of rewards. More specifically, the reward (of the set of rewards) corresponding to the selected configuration (of the set of configurations) is updated based on the analysis of the utilization data. The set of rewards is updated based on feedback included in the utilization data. Various embodiments for updating a rewards based on the utilization data for the reward are discussed at least in conjunction with pseudo-code 200 and method 400 of FIG. 4. At block 336, and in response to identifying and/or detecting (via the analysis of the utilization data) a triggered re-configuration event, the updated set of rewards and a selection algorithm are employed to select an updated configuration from the set of configurations. The MAB engine employs the updated set of rewards and selection algorithm (LTS selection algorithm 124 of FIG. 1A) to select the updated configuration. An LTS module (e.g., LTS module 172 of FIG. 1B) implements the selection algorithm. A MAB decision process (MAB decision process 122 of FIG. 1A implemented by the MAB engine) is employed to select the updated configuration. At block 338, the set of VCRs is re-configured based on the updated configuration. The VCR manager re-configures the set of VCRs using the updated configuration.

At decision block 340, it is determined whether to retire the set of VCRs. A VCR sunsetter (e.g., VCR sunsetter 168 of FIG. 1B) determines whether to retire the set of VCRs. For example, a sender of the request (of block 312) sends a request (e.g., to VCR controller 120 of FIGS. 1A-1B) to terminate the computational services. If the set of VCRs is to be retired, then method 300 flows to block 342. If the set of VCRs is not to be retired, then method 310 returns to block 320 to acquire additional utilization data.

At block 342, the set of rewards is updated based on the analysis of the utilization data. The MDP updates the set of rewards. More specifically, the reward (of the set of rewards) corresponding to the selected configuration (of the set of configurations) is updated based on the analysis of the utilization data. Various embodiments for updating a rewards based on the utilization data for the reward are discussed at least in conjunction with pseudo-code 200 of FIG. 2 and method 400 of FIG. 4. At block 344, the requested services are terminated and the set of VCRs is retired. The VCR sunsetter terminates the services and retires the set of VCRs.

In various embodiments, the set of rewards iteratively calculated via the loop of method 310 is subsequently employed when launching another (e.g., a second) set of VCRs to provide the requested services (or similar services). That is, method 310 exploits the iteratively determined set of rewards to launch, re-scale, and/or re-configure a second set of VCRs (e.g., second set of VCRs 144 of FIG. 1A). For instance, when launching a second set of VCRs, the MAB process is employed to select another (e.g., a second) configuration from the set of configurations based on the updated set of rewards and the selection algorithm. The second set of VCRs is launched with the second configuration. Upon launching the second set of VCRs, additional utilization for the second set of VCRs (and for the second configuration) is acquired. Similar to the first set of VCRs, additional utilization data is acquired and analyzed for the second set of VCRs. The set of rewards is iteratively updated based on the analysis of the utilization data. A third set of VCRs is launched via method 300 and the iteratively updated set of rewards.

FIG. 4A illustrates one embodiment of a method 400 for analyzing utilization data, in accordance with the various embodiments. Process 400 is performed by a VCR controller, such as but not limited to VCR controller 120 of FIG. 1A. For example, to enable pseudo-code 200 of FIG. 2, the VCR controller implements at least portions of method 400. Process 400 begins at block 402, where utilization data for a selected configuration for a set of VCRs (e.g., first set of VCRs 142 and/or second set of VCRs 144 of FIG. 1A) is received. The set of rewards is also received at block 402. The utilization data is received by the VCR controller. The utilization data is iteratively acquired and the set of rewards is iteratively estimated via method 310 of FIG. 3B (e.g., see blocks 320, 326, 334, and/or 342 of method 310). As such, the utilization data encodes an actual number of processing units (and/or cycles) of the physical computing resources that are provided to (or allocated for) the set of VCRs, when the set of VCRs provides the requested services. The utilization data encodes a time series of a number of physical processing devices (and/or cycles) that the set of VCRs utilize when providing the requested services. In at least one embodiment, the utilization data encodes a time series of a number of scaling events for the set of VCRs when providing the requested services. The number of scaling events includes a combination of a number of the scale-up events and a number of scale-down events for the set of VCRs when providing the requested services.

At block 404, the utilization data is scanned to identify and/or detect the time series of the number of allocated physical processing units (and/or cycles). At block 406, the utilization data is scanned to identify and/or detect the time series of the number of utilized processing units (and/or cycles). At block 408, the utilization data is scanned to identify and/or detect the time series of the number of scaling events. The utilization data monitor is employed to scan the utilization data to identify the various time series.

At block 410, a time series of a difference between the number of allocated processing units (and/or cycles) and the number of utilized processing units (and/or cycles) is generated. That is, at block 410, a time series of a difference between the actual number of processing units that are provided to the set of VCRs when providing the requested services and the number of processing devices that the set of VCRs utilizes when providing the requested services is generated. At block 412, the time series of the difference between the number of allocated processing units and the number of utilized processing units is accumulated, summed, integrated, and/or time-averaged. A utilization data monitor (e.g., utilization monitor 160 of FIG. 1A) implements at least portions of blocks 402-412.

At block 414, a processor-waste metric is determined. A MAB engine (e.g., MAB engine 170 of FIG. 1B) determines the processor-waste metric. The processor-waste metric is based on the accumulated, summed, integrated, and/or time-averaged time series of the difference between the number of allocated processing units and the number of utilized processing units. Thus, in some embodiments, a processor-waste metric is determined based on a summation of the time series of the difference between the actual number of processing units that are provided to the set of VCRs when providing the requested services and the number of processing devices that the set of VCRs utilizes when providing the requested. Determining the processor-waste metric could include calculating a resource wastage metric. Accordingly, determining the processor-waste metric could include determining and/or be equivalent to $\tilde{w}_t$ and/or a summed or time-averaged value of $\tilde{w}_t$ as described above.

At block 416, the time series of the number of scaling events is accumulated, summed, integrated, and/or time-averaged. At block 418, a scaling-event metric is determined. The scaling-event metric is based on the accumulated, summed, integrated, and/or time-averaged value of the time series of the number of scaling events. Thus, at block 418, a scaling-event metric is determined based on a summation of the time series of the number of scaling events for the set of VCRs when providing the requested services. Determining the scaling-event metric could include calculating an overhead metric. Accordingly, determining the scaling-event metric could include determining and/or be equivalent to $\tilde{s}_t$ and/or a summed or time-averaged value of $\tilde{s}_t$ as described above.

At block 420, an estimate for the reward metric for the selected configuration is updated. That is, a value for an updated reward metric (corresponding to the selected configuration) is determined, and the reward is updated to be equivalent to the updated value. In various embodiments, a value for the updated reward metric is based on the processor-waste metric. A value for the updated first reward metric is based on the scaling-event metric. In various embodiments, the updated estimate of the reward metric for the selected configuration is based on the processor-waste metric, the scaling-event metric, and the received estimate for the reward metric for the selected configuration. In various embodiments, the updated estimate for the reward metric includes determining and/or estimating $f_i$, as discussed above. Accordingly, the value of the updated reward metric is based on a negative of a weighted linear combination of a resource-waste metric and a scaling-event metric that is determined via the analysis of the utilization data. The MAB engine implements at least portions of blocks 414-420.

FIG. 4B illustrates one embodiment of a method 440 for the efficient and adaptive allocation of resources for virtualized computation via a Linear Thompson Sampling (LTS) algorithm (LTS selection algorithm 124 of FIG. 1B), in accordance to the various embodiments. Method 440 is performed by a VCR controller, such as but not limited to VCR controller 120 of FIGS. 1A-1B. More specifically, portions of method 400 are implemented by a multi-armed bandit (MAB) engine (e.g., MAB engine 170 of FIG. 1B), including but not limited to a LTS modules (e.g., LTS module 172) and a probability distribution manager (e.g., probability manager 174 of FIG. 1B). Method 440 implements one or more portions of pseudo-code 200 of FIG. 2. At least portions of portions of method 300 of FIG. 3A, 310 of FIG. 3B and/or method 400 of FIG. 4A implements at least portions of method 440. Method 442 begins at block 442, where input parameters are received. The input parameters are received by the MAB engine and/or the LTS module. As shown in FIG. 2, the input parameters include at least hyper-parameters indicating a standard deviation ($\sigma$) and a learning parameter ($\lambda$). The input parameters additionally includes a total number of steps for the for-loop (e.g., the for-loop indicated by lines 202-218 of pseudo-code 200 and/or blocks 444-462 of method 440).

At block 444, the for-loop is initialized and/or updated, as indicated in line 202 of pseudo-code 200. The MAB engine and/or the LTS module initializes the for-loop. For instance, a loop counter (e.g., t) is initialized and/or updated (e.g., incremented). At block 446, a selected configuration matrix (e.g., the 2-tensor $X_t = (x_0^T, x_1^T, x_2^T, \ldots, x_t^T)^T \in \mathbb{R}^{t \times D}$) is generated and/or updated as indicated in line 204 of pseudo-code 200. The updating of the configuration tensor is based on the configuration selected during the previous iteration of the loop. The MAB engine and/or the LTS module generates the configuration matrix. At block 448, an observed reward vector (e.g., $Y_t = (y_0, y_1, y_2, \ldots, y_t)^T \in \mathbb{R}^{t \times 1}$) is updated and/or generated, as shown in line 206 of pseudo-code 200. The reward vector is updated based on a reward observed and/or calculated from the utilization data generated during the previous iteration of the loop. The MAB engine and/or the LTS module updates the observed reward.

At block 450 a covariance matrix (e.g., $S_{t-1} = (\sigma^{-2} X_{t-1}^T X_{t-1} + \lambda I_D)^{-1} \in \mathbb{R}^{D \times D}$) is updated and/or generated, as shown in line 208 of pseudo-code 200, based on the updated selected configuration matrix. The MAB engine and/or the LTS module updates the observed reward. At block 452, one or more statistical distributions (e.g., $\mathcal{N}(\overline{\theta}_{t-1}, S_{t-1}) \in \mathbb{R}^{D \times 1}$) are updated based on the updated selected configuration matrix, the updated reward vector, and the updated covariance matrix. The statistical distribution manager updates the statistical distributions. Note that updating the covariance matrix includes updating the mean column vector: $\overline{\theta}_{t-1} = \sigma^{-2} S_{t-1} X_{t-1}^T Y_{t-1} \in \mathbb{R}^{D \times 1}$. Lines 208-212 of pseudo-code show updating the statistical distributions. Note that updating the statistical distributions includes updating the statistical distributions via Bayes' Theorem. Thus, updating the statistical distributions includes calculating a posterior distribution based on the priors (e.g., conjugate priors) and the utilization data acquired during the previous iteration of the loop.

At block 454, a reward is predicted for each configuration in the set of configurations based on the updated statistical distributions. The MAB engine and/or the LTS module predicts the rewards. Predicting the reward includes sampling each of the updated statistical distributions. The probability distribution manager samples the updated distributions. Sampling the updated distributions generates one or more coefficients, parameters, and/or components for the linear model (e.g., $\theta_t \sim \mathcal{N}(\overline{\theta}_{t-1}, S_{t-1}) \in \mathbb{R}^{D \times 1}$) employed to calculate the reward. Calculating the predicted rewards for a selected configuration is based on the dot product between the feature vector for the corresponding configuration and the model (e.g., $x_i \cdot \theta$). Lines 212-214 indicate how the reward is predicted for each configuration based on the feature vector for the configuration. At block 456, a configuration, associated with the largest predicted reward) is selected, as indicated in line 214 of pseudo-code 200. The MAB engine and/or the LTS module selects the largest predicted reward. At block 458, a set of VCRs is deployed in accordance with the configuration selected at block 456. The MAB engine and/or the LTS module selects the largest predicted reward deploys the selected configuration. At block 460, utilization data is collected, as shown in line 216 of pseudo-code 200. A utilization data monitor (e.g., utilization data monitor 160 of FIG. 1B) collects and/or acquires the utilization data. Observing utilization data includes observing and storing an observed reward, $y_t = f(t)$ as described above. Various embodiments of observing utilization data are discussed in conjunction with at least method 300 of FIG. 3A, method 310 of FIG. 3B, and method 400 of FIG. 4A. At decision block 462, it is determined whether to terminate the loop based on a current value of the loop counter and the input parameters indicating the total number of loops. If the loop is not to be terminated, method 400 returns to block 444. Otherwise, method 440 proceeds to block 464, where method 440 is terminated. The MAB engine and/or the LTS module implements at least portions of 462-464.

Other Embodiments

The technology described herein is directed towards enhanced methods and systems for the efficient and adaptive allocation of resources for container-based computation via Markov Decision Processes (MDP). In at least some embodiments, the MDP is state-independent (or a single-state) MDP. Thus, in these non-limiting embodiments, the MDP is a multi-armed banded (MAB) decision process. The enhanced MAB decision process employs an enhanced Linear Thompson Sampling algorithm. One non-limiting embodiment method is for providing requested computational services via a set of visualized computational resources (VCRs), e.g., first set of VCRs 142 of FIG. 1A. The method includes instantiating a reward model (e.g., $\theta$) based on sampling a set of statistical distributions ($\theta_t \sim \mathcal{N}(\overline{\theta}_{t-1}, S_{t-1}) \in \mathbb{R}^{D \times 1}$), as indicated in line 212 of pseudo-code 200 of FIG. 2. The reward model includes a set of coefficients. Each statistical distribution of the set of statistical distributions corresponds to a separate coefficient of the set of coefficients. An expected reward for each configuration of a set of configurations is estimated. Estimating the expected reward for a configuration of the set of configurations is based on the reward model and a vector representation of the configuration (e.g., $x_i \cdot \theta$). Each configuration of the set of configurations corresponds to a candidate allocation of the set of VCRs. A first configuration of the set of configurations is selected and/or identified based on the expected reward for each of the configurations of the set of configurations. For instance, line 214 of pseudo-code 200 indicates a selection of a "best" configuration. The method includes causing operation of the set of VCRs in accordance with the first configuration.

In various embodiments, the model includes acquiring utilization data that corresponds to the set of VCRs being operated in accordance to the first configuration. For instance, method 400 of FIG. 4A discusses various embodiments of acquiring utilization data. An observed reward is determined for the first configuration based on the acquired utilization data. The set of statistical distributions is updated based on the observed reward for the first configuration. For example, lines 204-210 of pseudo-code 200 indicate updating the set of statistical distributions. In at least one embodiment, the method further includes instantiating an updated reward model based on sampling the updated set of statistical distributions. An updated expected reward is estimated for each configuration of the set of configurations based on the updated reward model and the vector representation of the configuration. A second configuration of the set of configurations is identified and/or selected based on the updated expected reward for each of the configurations of the set of configurations. The method further includes causing an operation of the set of VCRs in accordance with the second configuration. Additional utilization data is acquired. The additional utilization data corresponds to the set of VCRs being operated in accordance to the second configuration. An observed reward for the second configuration is determined based on the acquired additional utilization data. The set of statistical distributions is updated based on the observed reward for the second configuration.

In some embodiments, each statistical distribution of the set of statistical distributions is characterized by a separate set of statistical parameters that are determined based on previously acquired utilization data. In various embodiments, each configuration of the set of configurations includes a lower-utilization threshold. The lower-utilization threshold indicates a first condition that triggers a scale-up event for the set of VCRs when providing a requested service. The configuration additionally includes an upper-utilization threshold. The upper-utilization threshold indicates a second condition that triggers a scale-down event for the first set of VCRs when providing the requested services. The set of statistical distributions is based on utilization data. The utilization data includes a time series of a number of scaling events for the set of VCRs when providing the requested services. The number of scaling events includes a combination of a number of the scale-up events for the set of VCRs when providing the requested services and a number of the scale-down events for the set of VCRs when providing the requested services.

The set of coefficients of the reward model is included as components of a reward vector. Estimating the expected reward for the first configuration includes calculating a dot product between the reward vector and the vector representation of the first configuration. In at least one embodiment, the set of statistical distributions includes a normal and/or Gaussian distribution.

Another non-limiting embodiment method is for implementing an application (via a first set of containers) under a first workload. The method includes acquiring utilization data for the first set of containers. The first set of containers was launched with a first configuration of a set of configurations, or at least the first set of containers is currently configured with the first configuration. For example, the first set of containers was launched with a different configurations, but has been re-configured and/or re-scaled with the first configuration since the initial launching of the first set of containers with the different configuration of the set of configurations. Each configuration of the set of configurations corresponds to a candidate allocation of the computational resources for the first set of containers. A set of rewards (or reward metrics) indicates computational resource allocation efficiencies associated with the set of configurations (as measured via encodings of the utilization data). The method includes updating the set of rewards based on an analysis of the acquired utilization data. Each reward metric of the set of reward metrics corresponds to a separate configuration of the set of configurations. Updating the set of rewards metrics includes updating a first reward metric of the set of reward metrics. The first reward metric corresponds to the first configuration. Updating the first reward is based on an analysis of the utilization data. The utilization data encodes a utilization of a first allocation of the computational resources. The first allocation corresponds to the first configuration, when the first set of the container implements the application under the first workload. A second configuration of the set of configurations is selected. The selection of the second configuration is based on a selection algorithm and the updated set of reward metrics. A second set of containers is launched with the second configuration. In other embodiments, the first set of containers is re-configured with the second configuration. In at least one embodiments, the first and second configurations are the same configuration of the set of configurations.

In various embodiments, the method further includes acquiring additional utilization data for the second set of containers. The additional utilization data encodes a utilization of a second allocation of the computational resources. The second allocation corresponds to the second configuration, when the second set of containers implements the application under a second workload. The set of reward metrics is updated. Updating the set of reward metrics includes updating a second reward metric of the set of reward metrics. The second reward metric corresponds to the second configuration. Updating the second reward metric is based on an analysis of the additional utilization data. A third configuration of the set of configurations is selected. The selection of the third configuration is based on the selection algorithm and the updated set of reward metrics. A third set of containers is launched with the third configuration. In other embodiments, the first or the second set of containers are re-configured with the third configuration. In at least one embodiment, the third configuration is the same configuration as at least one of the first or second configurations of the set of configurations.

In various embodiments, each configuration of the set of configurations included (or at least indicates) an initial number of processing devices (and/or cycles) of the computing resources that are initially provided to the first set of containers when the first set of containers implements the application under the first workload. The utilization data encodes a time series of an actual number of processing units of the computing resources that are provided to the first set of containers when the first set of containers implements the application under the first workload. The utilization data further encodes a time series of a number of processing devices that the first set of containers utilize when the first set of containers implements the application under the first workload. In various embodiments, the analysis of the utilization data includes generating a time series of a difference between the actual number of processing units that are provided to the first set of containers when the first set of containers implements the application under the first workload and the number of processing devices that the first set of containers utilizes when the first set of containers implements the application under the first workload. A processor-waste metric d determined and/or calculate. The determination of the processor-waste metric is based on an accumulation, summation, integration, and/or time-averaging of the time series of the difference between the actual number of processing units that are provided to the first set of containers when the first set of containers implements the application under the first workload and the number of processing devices that the first set of containers utilizes when the first set of containers implements the application under the first workload. A value for the updated first reward metric is determined based on the processor-waste metric.

In various embodiments, each configuration of the set of configurations includes (or at least indicates) a lower-utilization threshold indicating a first condition that triggers a scale-up event for the set of containers when the first set of containers implements the application under the first workload. Each configuration of the set of containers additionally includes (or at least indicate) an upper-utilization threshold indicating a second condition that triggers a scale-down event for the first set of containers when the first set of containers implements the application under the first workload. The utilization data encodes a time series of a number of scaling events for the first set of containers when the first set of containers implements the application under the first workload. The time series of the number of scaling events includes a combination of a number of the scale-up events for the first set of containers when the first set of containers implements the application under the first workload and a number of the scale-down events for the first set of containers when the first set of containers implements the application under the first workload. The analysis of the utilization data includes determining a scaling-event metric. Determining the scaling-event metric is based on an accumulation, summation, integration, and/or time-averaging of the time series of the number of scaling events for the first set of containers when the first set of containers implements the application under the first workload. The analysis of the utilization data further includes determining a value for the updated first reward metric based on the scaling-event metric.

In some embodiments, the scale-up events include increasing a cardinality of the first set of containers when the first set of containers implements the application under the first workload. Similarly, the scale-down events include decreasing the cardinality of the first set of containers when the first set of containers implements the application under the first workload. The selection algorithm includes at least one of an epsilon-greedy algorithm, a Boltzmann exploration algorithm, an upper confidence bounds (UCB) algorithm, Thompson sampling, explore-then-commit, or an exponential-weight algorithm (e.g., EXP3) for exploration and exploitation. A value of the updated first reward metric is based on an inverse of a weighted linear combination of a resource-waste metric and a scaling-event metric that are determined via the analysis of the utilization data. The selection algorithm selects the second configuration from the set of configurations based on at least one of a ranking of the updated set of reward metrics, an exploration-exploitation balancing policy, and a stochastically-determined value.

Illustrative Computing Device

Having described embodiments of the present invention, an example operating environment in which embodiments of the present invention is implemented is described below in order to provide a general context for various aspects of the present invention. Referring to FIG. 5, an illustrative operating environment for implementing embodiments of the present invention is shown and designated generally as computing device 500. Computing device 500 is but one example of a suitable computing environment and is not intended to suggest any limitation as to the scope of use or functionality of the invention. Neither should the computing device 500 be interpreted as having any dependency or requirement relating to any one or combination of components illustrated.

Embodiments of the invention are described in the general context of computer code or machine-useable instructions, including computer-executable instructions such as program modules, being executed by a computer or other machine, such as a smartphone or other handheld device. Generally, program modules, or engines, including routines, programs, objects, components, data structures, etc., refer to code that perform particular tasks or implement particular abstract data types. Embodiments of the invention are practiced in a variety of system configurations, including hand-held devices, consumer electronics, general-purpose computers, more specialized computing devices, etc. Embodiments of the invention could also be practiced in distributed computing environments where tasks are performed by remote-processing devices that are linked through a communications network.

With reference to FIG. 5, computing device 500 includes a bus 510 that directly or indirectly couples the following devices: memory 512, one or more processors 514, one or more presentation components 516, input/output ports 518, input/output components 520, and an illustrative power supply 522. Bus 510 represents what is one or more busses (such as an address bus, data bus, or combination thereof). Although the various blocks of FIG. 5 are shown with clearly delineated lines for the sake of clarity, in reality, such delineations are not so clear and these lines could overlap. For example, one could consider a presentation component such as a display device to be an I/O component, as well. Also, processors generally have memory in the form of cache. We recognize that such is the nature of the art, and reiterate that the diagram of FIG. 5 is merely illustrative of an example computing device that can be used in connection with one or more embodiments of the present disclosure. Distinction is not made between such categories as "workstation," "server," "laptop," "hand-held device," etc., as all are contemplated within the scope of FIG. 5 and reference to "computing device."

Computing device 500 typically includes a variety of computer-readable media. Computer-readable media can be any available media that can be accessed by computing device 500 and includes both volatile and nonvolatile media, removable and non-removable media. By way of example, and not limitation, computer-readable media could comprise computer storage media and communication media.

Computer storage media include volatile and nonvolatile, removable and non-removable media implemented in any method or technology for storage of information such as computer-readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computing device 500. Computer storage media excludes signals per se.

Communication media typically embodies computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer-readable media.

Memory 512 includes computer storage media in the form of volatile and/or nonvolatile memory. Memory 512 is non-transitory memory. As depicted, memory 512 includes instructions 524. Instructions 524, when executed by processor(s) 514 are configured to cause the computing device to perform any of the operations described herein, in reference to the above discussed figures, or to implement any program modules described herein. The memory is removable, non-removable, or a combination thereof. Illustrative hardware devices include solid-state memory, hard drives, optical-disc drives, etc. Computing device 500 includes one or more processors that read data from various entities such as memory 512 or I/O components 520. Presentation component(s) 516 present data indications to a user or other device. Illustrative presentation components include a display device, speaker, printing component, vibrating component, etc.

I/O ports 518 allow computing device 500 to be logically coupled to other devices including I/O components 520, some of which is built in. Illustrative components include a microphone, joystick, game pad, satellite dish, scanner, printer, wireless device, etc.

Embodiments presented herein have been described in relation to particular embodiments which are intended in all respects to be illustrative rather than restrictive. Alternative embodiments will become apparent to those of ordinary skill in the art to which the present disclosure pertains without departing from its scope.

From the foregoing, it will be seen that this disclosure in one well adapted to attain all the ends and objects hereinabove set forth together with other advantages which are obvious and which are inherent to the structure.

It will be understood that certain features and sub-combinations are of utility and are employed without reference to other features or sub-combinations. This is contemplated by and is within the scope of the claims.

In the preceding detailed description, reference is made to the accompanying drawings which form a part hereof wherein like numerals designate like parts throughout, and in which is shown, by way of illustration, embodiments that are practiced. It is to be understood that other embodiments are utilized and structural or logical changes are made without departing from the scope of the present disclosure. Therefore, the preceding detailed description is not to be taken in a limiting sense, and the scope of embodiments is defined by the appended claims and their equivalents.

Various aspects of the illustrative embodiments have been described using terms commonly employed by those skilled in the art to convey the substance of their work to others skilled in the art. However, it will be apparent to those skilled in the art that alternate embodiments are practiced with only some of the described aspects. For purposes of explanation, specific numbers, materials, and configurations are set forth in order to provide a thorough understanding of the illustrative embodiments. However, it will be apparent to one skilled in the art that alternate embodiments are practiced without the specific details. In other instances, well-known features have been omitted or simplified in order not to obscure the illustrative embodiments.

Various operations have been described as multiple discrete operations, in turn, in a manner that is most helpful in understanding the illustrative embodiments; however, the order of description should not be construed as to imply that these operations are necessarily order dependent. In particular, these operations need not be performed in the order of presentation. Further, descriptions of operations as separate operations should not be construed as requiring that the operations be necessarily performed independently and/or by separate entities. Descriptions of entities and/or modules as separate modules should likewise not be construed as requiring that the modules be separate and/or perform separate operations. In various embodiments, illustrated and/or described operations, entities, data, and/or modules are merged, broken into further sub-parts, and/or omitted.

The phrase "in one embodiment" or "in an embodiment" is used repeatedly. The phrase generally does not refer to the same embodiment; however, it could. The terms "comprising," "having," and "including" are synonymous, unless the context dictates otherwise. The phrase "A/B" means "A or B." The phrase "A and/or B" means "(A), (B), or (A and B)." The phrase "at least one of A, B and C" means "(A), (B), (C), (A and B), (A and C), (B and C) or (A, B and C)."

What is claimed is:

1. A computer-implemented method for managing computational resources for operating a set of virtualized computational resources (VCRs), the method comprising:
   in response to receiving a request to launch a set of VCRs, generating, via a model generating module, a reward model based on a set of statistical distributions;
   predicting, via a reward identifying module, an expected reward for each configuration of a set of configurations based on a dot product of a reward vector representing the reward model and a configuration vector for one or more parameters of the corresponding configuration, the expected reward indicating an efficiency in distribution or allocation of physical computation resources to the set of VCRs;
   selecting, via a configuration identifying module, a configuration of the set of configurations based on the predicted expected reward for the configuration; and
   initiating, via a VCR deployer, the set of VCRs configured with the selected configuration.

2. The method for claim 1, further comprising:
   monitoring, via a VCR monitor, the set of VCRs;
   while monitoring the set of VCRs, receiving, at a utilization data monitor, utilization data that is generated by a utilization of the set of VCRs;
   determining, at the model generating module, an observed reward for the selected configuration based on the received utilization data; and
   updating, via a probability distribution manager, the set of statistical distributions based on the observed reward for the selected configuration.

3. The method of claim 2, further comprising:
   generating, via the model generating module, an updated reward model based on the updated set of statistical distributions;
   predicting, via the reward identifying module, an updated expected reward for each configuration of the set of configurations based on the updated reward model and the one or more parameters of the configuration;
   selecting, via the configuration identifying module, another configuration of the set of configurations based on the updated expected reward for the another configuration;
   launching, via the VCR deployer, a second set of VCRs configured via the another configuration;
   monitoring, via the VCR monitor, the second set of VCRs;
   while monitoring the second set of VCRs, receiving, at the utilization data monitor, additional utilization data that is generated by a utilization of the second set of VCRs;
   determining, at the model generating module, an observed reward for the another configuration based on the additional utilization data; and
   updating, via the probability distribution manager, the set of statistical distributions based on the observed reward for the another configuration.

4. The method of claim 1, wherein the reward model includes a set of coefficients and each statistical distribution of the set of statistical distributions corresponds to a separate coefficient of the set of coefficients.

5. The method of claim 1, wherein each configuration of the set of configurations includes a lower-utilization threshold indicating a first condition that triggers a scale-up event for the set of VCRs when providing a requested service and an upper-utilization threshold indicating a second condition that triggers a scale-down event for the first set of VCRs when providing the requested services, and the set of statistical distributions is based on utilization data that encodes:
   generating, via a utilization data monitor, a time series of a number of scaling events for the set of VCRs when providing the requested services that includes a combination of a number of the scale-up events for the set of VCRs when providing the requested services and a number of the scale-down events for the set of VCRs when providing the requested services.

6. The method of claim 1, wherein the one or more parameters of each configuration are encoded in the configuration vector that corresponds to the configuration.

7. The method of claim 6, wherein a set of coefficients of the reward model are included as components of a reward vector.

8. A computing system for operating a set of virtualized computational resources (VCRs), the system comprising:
   a processor device; and
   a computer-readable storage medium, coupled with the processor device, having instructions stored thereon, which, when executed by the processor device, perform actions comprising:
   instantiating, by a model generating module, a reward model based on sampling a set of statistical distributions, wherein the reward model includes a set of coefficients and each statistical distribution of the set of statistical distributions corresponds to a separate coefficient of the set of coefficients;
   determining, by a reward identifying module, an expected reward for each configuration of a set of configurations based on a dot product of a reward vector representing the reward model and a configuration vector representation of the configuration, wherein each configuration of the set of configurations corresponds to a candidate allocation of the set of VCRs;
   selecting, by a configuration identifying module, a first configuration of the set of configurations based on the expected reward for each of the configurations of the set of configurations; and
   causing, by a VCR deployer, operation of the set of VCRs in accordance with the first configuration.

9. The system of claim 8, the actions further comprising:
   acquiring utilization data that corresponds to the set of VCRs being operated in accordance to the first configuration;
   determining an observed reward for the first configuration based on the acquired utilization data; and
   updating the set of statistical distributions based on the observed reward for the first configuration.

10. The system of claim 9, the actions further comprising:
   instantiating an updated reward model based on sampling the updated set of statistical distributions;
   estimating an updated expected reward for each configuration of the set of configurations based on the updated reward model and the vector representation of the configuration;
   selecting a second configuration of the set of configurations based on the updated expected reward for each of the configurations of the set of configurations;
   causing an operation of the set of VCRs in accordance with the second configuration;
   acquiring additional utilization data that corresponds to the set of VCRs being operated in accordance to the second configuration;

determining an observed reward for the second configuration based on the acquired additional utilization data; and updating the set of statistical distributions based on the observed reward for the second configuration.

11. The system of claim 8, wherein each statistical distribution of the set of statistical distributions is characterized by a separate set of statistical parameters that are determined based on previously acquired utilization data.

12. The system of claim 8, wherein each configuration of the set of configurations includes a lower-utilization threshold indicating a first condition that triggers a scale-up event for the set of VCRs when providing a requested service and an upper-utilization threshold indicating a second condition that triggers a scale-down event for the first set of VCRs when providing the requested services, and the set of statistical distributions is based on utilization data that encodes:

a time series of a number of scaling events for the set of VCRs when providing the requested services that includes a combination of a number of the scale-up events for the set of VCRs when providing the requested services and a number of the scale-down events for the set of VCRs when providing the requested services.

13. The system of claim 8, wherein the set of coefficients of the reward model are included as components of the reward vector.

14. The system of claim 8, wherein the set of statistical distributions includes a normal distribution.

15. A system comprising:

means for predicting an expected reward for each configuration of a set of configurations based on a dot product of a reward vector representing a reward model and a configuration vector representing one or more parameters of the corresponding configuration;

means for selecting a configuration of the set of configurations based on the predicted expected reward for the first configuration; and means for initiating deployment of a set of virtualized computational resources configured with the selected configuration.

16. The system of claim 15, further comprising means for generating the reward model based on a set of statistical distributions.

17. The system of claim 15, wherein the set of virtualized computational resources includes at least one of a virtual machine (VM) or a container.

18. The system of claim 16, wherein each statistical distribution of the set of statistical distributions is characterized by a separate set of statistical parameters that are determined based on previously acquired utilization data.

19. The system of claim 15, wherein predicting the expected reward for each configuration of a set of configurations comprises calculating the expected reward based on sampling a set of statistical distributions and a vector representation of each configuration of the set of configurations.

20. The system of claim 15, wherein selecting the configuration is based on the configuration having a largest expected reward of the set of configurations.

* * * * *